US012640988B2

(12) United States Patent
Kote et al.

(10) Patent No.: US 12,640,988 B2
(45) Date of Patent: May 26, 2026

(54) USING REAL-TIME SERIES DATA TO FORECAST, MONITOR AND MAINTAIN SERVER INFRASTRUCTURE

(71) Applicant: Dell Products L.P., Round Rock, TX (US)

(72) Inventors: Nithish Kote, Bangalore (IN); Nitin Khatkar, New Delhi (IN); Vinay Kumar Lokeshappa Malligere, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 76 days.

(21) Appl. No.: 18/667,519

(22) Filed: May 17, 2024

(65) Prior Publication Data

US 2025/0358195 A1 Nov. 20, 2025

(51) Int. Cl.
*H04L 41/14* (2022.01)
*H04L 41/147* (2022.01)
*H04L 43/045* (2022.01)

(52) U.S. Cl.
CPC .......... *H04L 41/145* (2013.01); *H04L 41/147* (2013.01); *H04L 43/045* (2013.01)

(58) Field of Classification Search
None
See application file for complete search history.

(56) References Cited

U.S. PATENT DOCUMENTS

| | | | | |
|---|---|---|---|---|
| 2022/0400394 A1* | 12/2022 | Eleftheriadis | ......... | H04L 41/145 |
| 2023/0136756 A1* | 5/2023 | Malboubi | ............ | H04L 43/045 |
| | | | | 709/224 |
| 2024/0333615 A1* | 10/2024 | Ford | ...................... | H04L 43/045 |
| 2024/0362047 A1* | 10/2024 | Spain | ................ | G06Q 10/0633 |
| 2025/0158883 A1* | 5/2025 | Rayes | ................ | H04L 41/0833 |
| 2025/0200394 A1* | 6/2025 | Naseem | ................ | G06N 5/022 |

* cited by examiner

*Primary Examiner* — Fadi Haj Said
(74) *Attorney, Agent, or Firm* — Amin, Turocy & Watson, LLP

(57) ABSTRACT

The technology described herein is directed towards collecting telecommunications server infrastructure data, such as performance parameter values/metric data of server resources, and clustering (e.g., via k-means clustering) the data to generate server infrastructure information. The server infrastructure performance parameter data can be used for monitoring the server infrastructure, including telecommunication baseband units in real-time. The clustered performance parameter data can be visualized and analyzed, such as to alert an administrator in the event of one or more low performing baseband units, for maintaining the server infrastructure, and/or for forecasting server infrastructure resource needs. In one implementation, real-time telecommunications statistics can be streamed to dynamically manage the telecommunications server infrastructure in a C-RAN environment, providing an end-to-end solution, including to view and analyze a datacenter's resource behavior on a production or test environment.

20 Claims, 24 Drawing Sheets

The Elbow Method Graph

Clusters of VMs

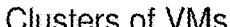
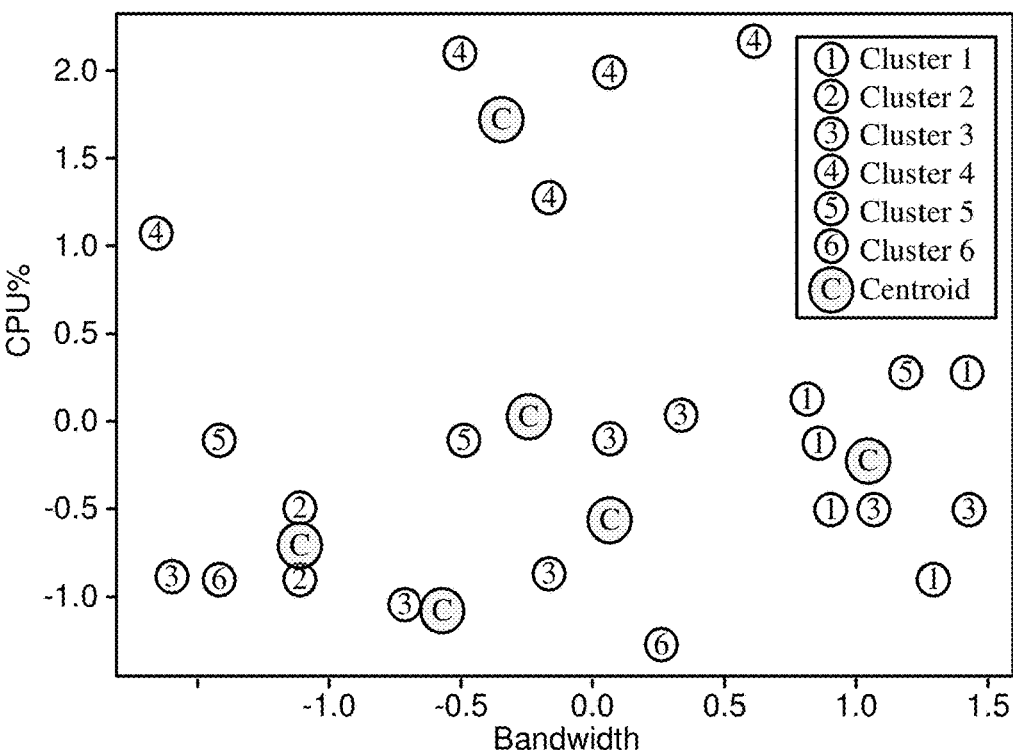
FIG. 14A
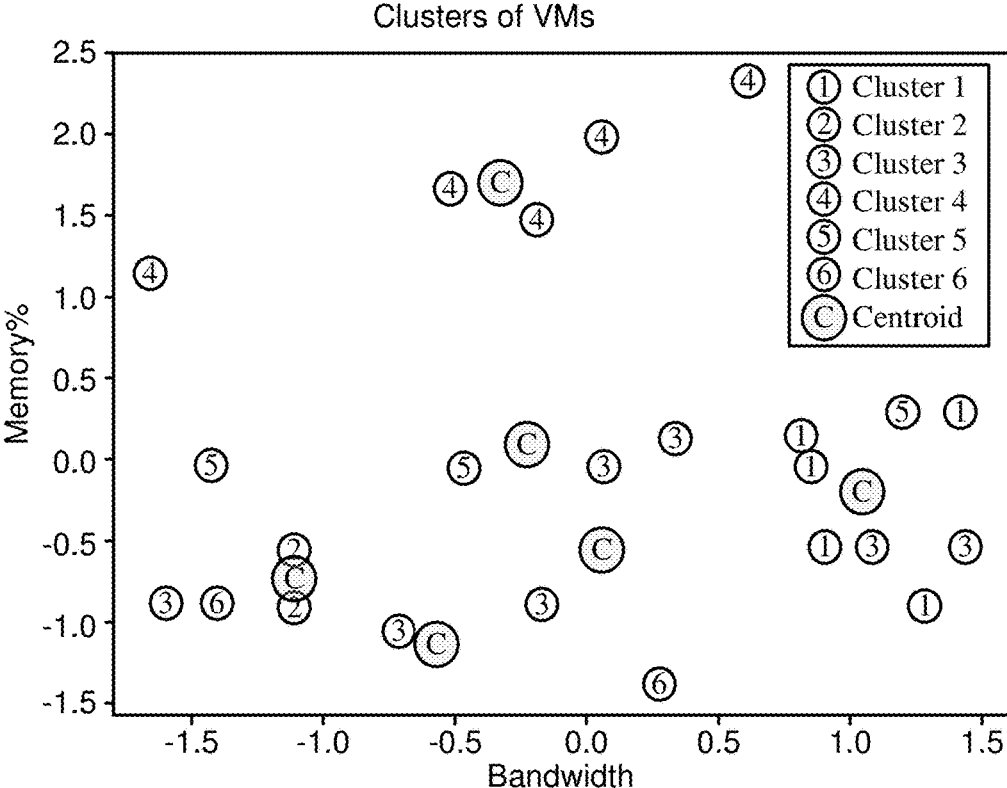
FIG. 14B

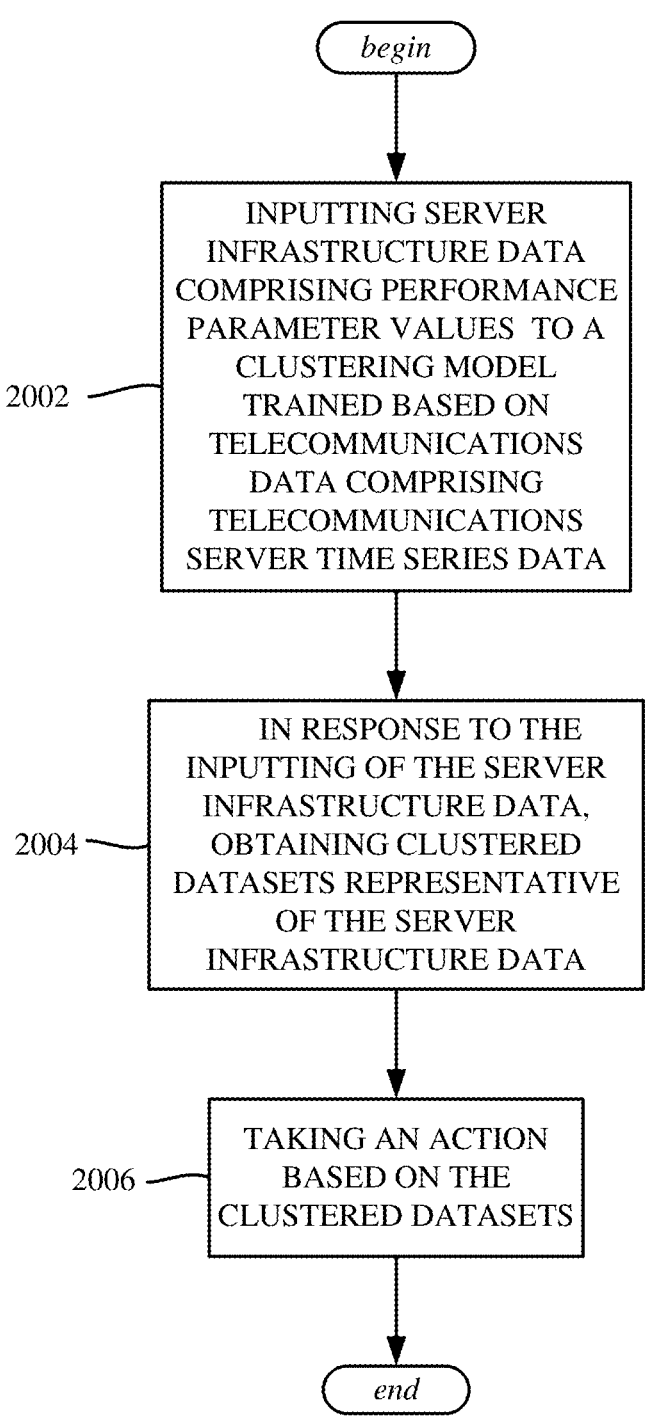

2002

INPUTTING SERVER INFRASTRUCTURE DATA COMPRISING PERFORMANCE PARAMETER VALUES TO A CLUSTERING MODEL TRAINED BASED ON TELECOMMUNICATIONS DATA COMPRISING TELECOMMUNICATIONS SERVER TIME SERIES DATA

2004

IN RESPONSE TO THE INPUTTING OF THE SERVER INFRASTRUCTURE DATA, OBTAINING CLUSTERED DATASETS REPRESENTATIVE OF THE SERVER INFRASTRUCTURE DATA

2006

TAKING AN ACTION BASED ON THE CLUSTERED DATASETS

FIG. 20

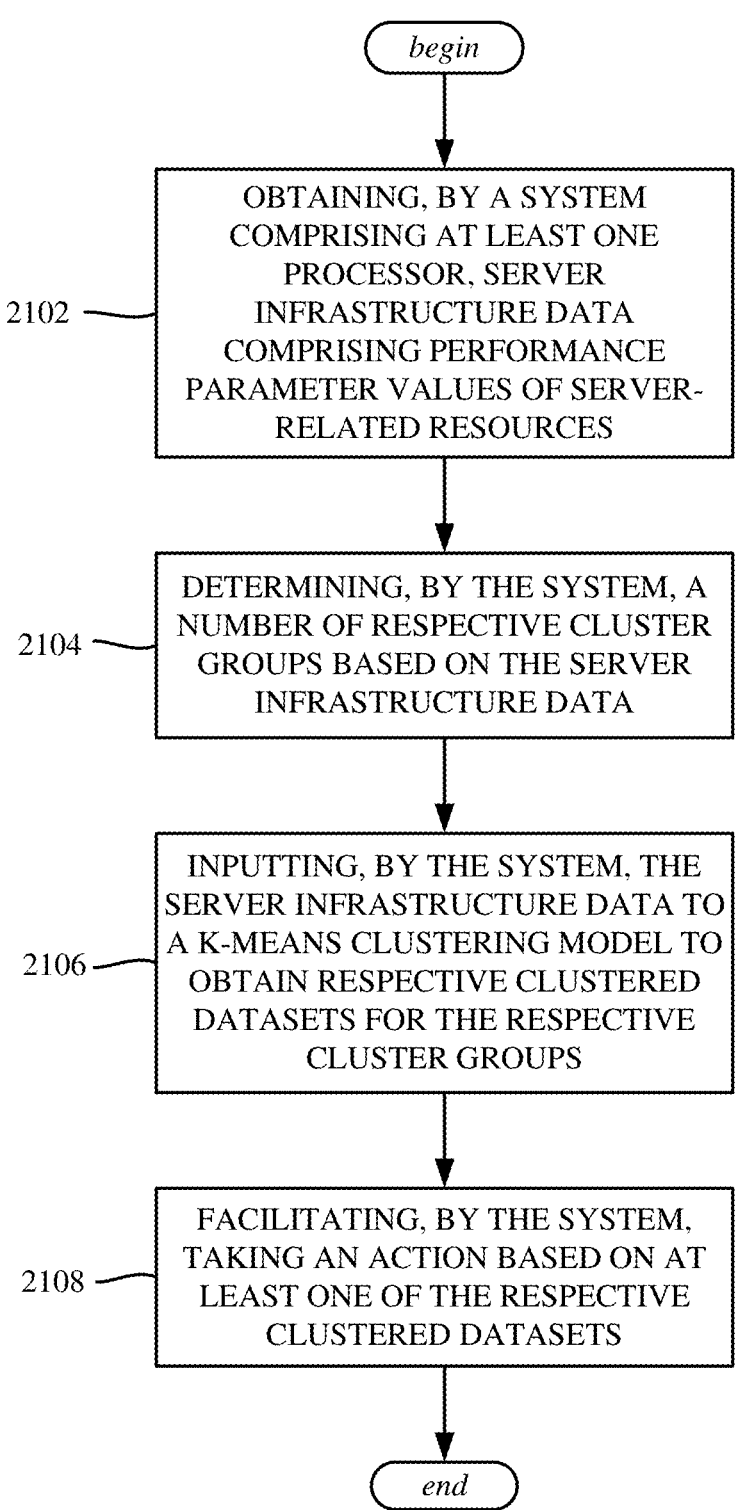

begin

2102 — OBTAINING, BY A SYSTEM COMPRISING AT LEAST ONE PROCESSOR, SERVER INFRASTRUCTURE DATA COMPRISING PERFORMANCE PARAMETER VALUES OF SERVER-RELATED RESOURCES

2104 — DETERMINING, BY THE SYSTEM, A NUMBER OF RESPECTIVE CLUSTER GROUPS BASED ON THE SERVER INFRASTRUCTURE DATA

2106 — INPUTTING, BY THE SYSTEM, THE SERVER INFRASTRUCTURE DATA TO A K-MEANS CLUSTERING MODEL TO OBTAIN RESPECTIVE CLUSTERED DATASETS FOR THE RESPECTIVE CLUSTER GROUPS

2108 — FACILITATING, BY THE SYSTEM, TAKING AN ACTION BASED ON AT LEAST ONE OF THE RESPECTIVE CLUSTERED DATASETS end

FIG. 21

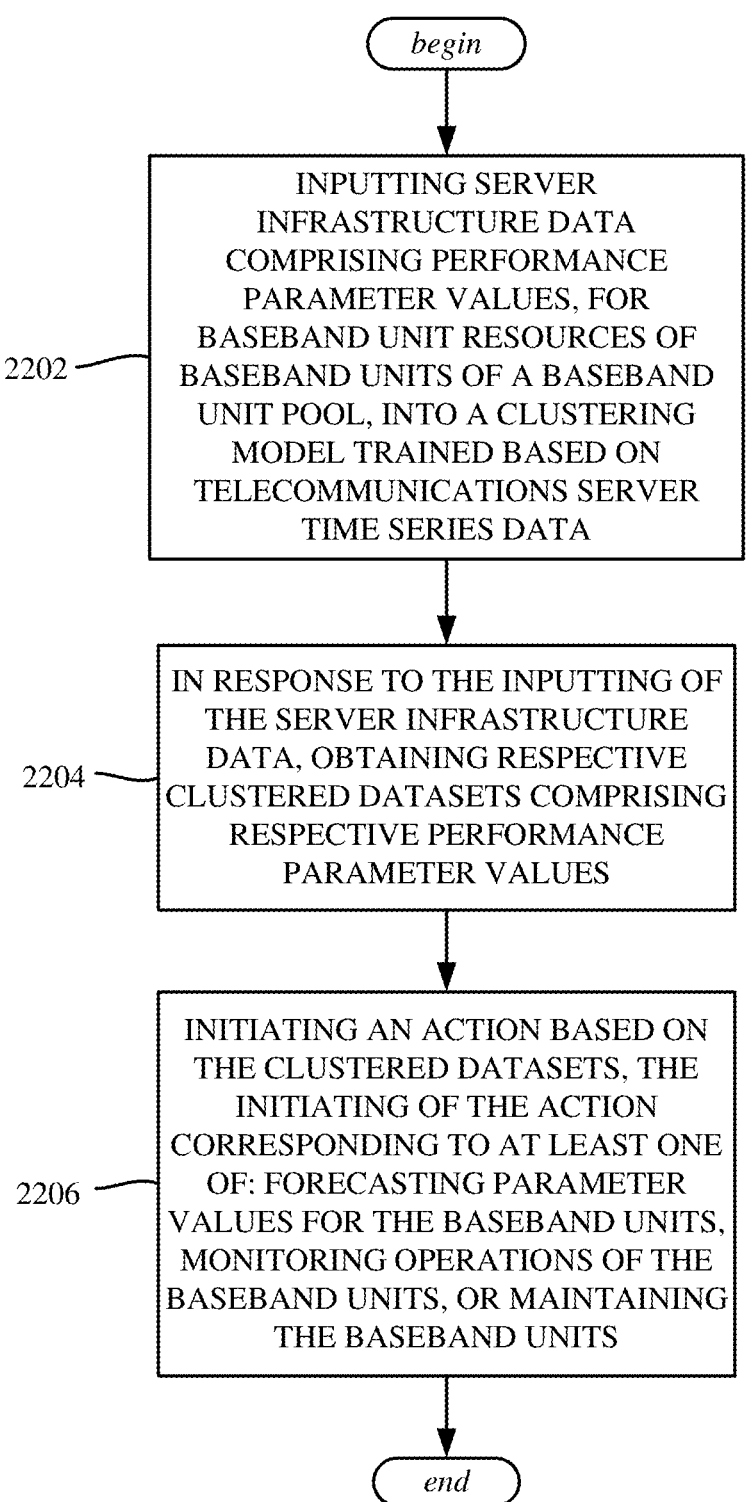

begin

2202 — INPUTTING SERVER INFRASTRUCTURE DATA COMPRISING PERFORMANCE PARAMETER VALUES, FOR BASEBAND UNIT RESOURCES OF BASEBAND UNITS OF A BASEBAND UNIT POOL, INTO A CLUSTERING MODEL TRAINED BASED ON TELECOMMUNICATIONS SERVER TIME SERIES DATA

2204 — IN RESPONSE TO THE INPUTTING OF THE SERVER INFRASTRUCTURE DATA, OBTAINING RESPECTIVE CLUSTERED DATASETS COMPRISING RESPECTIVE PERFORMANCE PARAMETER VALUES

2206 — INITIATING AN ACTION BASED ON THE CLUSTERED DATASETS, THE INITIATING OF THE ACTION CORRESPONDING TO AT LEAST ONE OF: FORECASTING PARAMETER VALUES FOR THE BASEBAND UNITS, MONITORING OPERATIONS OF THE BASEBAND UNITS, OR MAINTAINING THE BASEBAND UNITS end

FIG. 22

USING REAL-TIME SERIES DATA TO FORECAST, MONITOR AND MAINTAIN SERVER INFRASTRUCTURE

BACKGROUND

Telecommunications companies, such as those that offer wireless communications services, look for insights into the different segments within their customer base and network/ server infrastructure, enabling them to tailor their services accordingly. As one example, telecommunications companies are concerned with identifying segments of their customers that are more likely to churn (cancel their subscriptions), and take proactive measures to retain such customers. As another example, telecommunications companies plan enhancements to their server infrastructure based on expected future deliverables.

BRIEF DESCRIPTION OF THE DRAWINGS

The technology described herein is illustrated by way of example and not limited in the accompanying figures in which like reference numerals indicate similar elements and in which:

FIGS. 5B-19 are graphical representations of various example performance parameter value comparison plots for six clusters of virtual machines/servers for use in data analysis, in accordance with various embodiments and implementations of the subject disclosure.

FIG. 20 is a flow diagram showing example operations related to obtaining clustered datasets, representative of server infrastructure data, from a clustering model and taking an action based on the clustered datasets, in accordance with various embodiments and implementations of the subject disclosure.

FIG. 21 is a flow diagram showing example operations related to inputting server infrastructure data to a k-means clustering model to obtain respective clustered datasets for respective cluster groups, in accordance with various embodiments and implementations of the subject disclosure.

FIG. 22 is a flow diagram showing example operations related to obtaining respective clustered datasets of respective performance parameter values of baseband units to initiate action(s) with respect to parameter values for the baseband units, monitoring operations of the baseband units, and/or maintaining the baseband units, in accordance with various embodiments and implementations of the subject disclosure.

DETAILED DESCRIPTION

Figure 1:
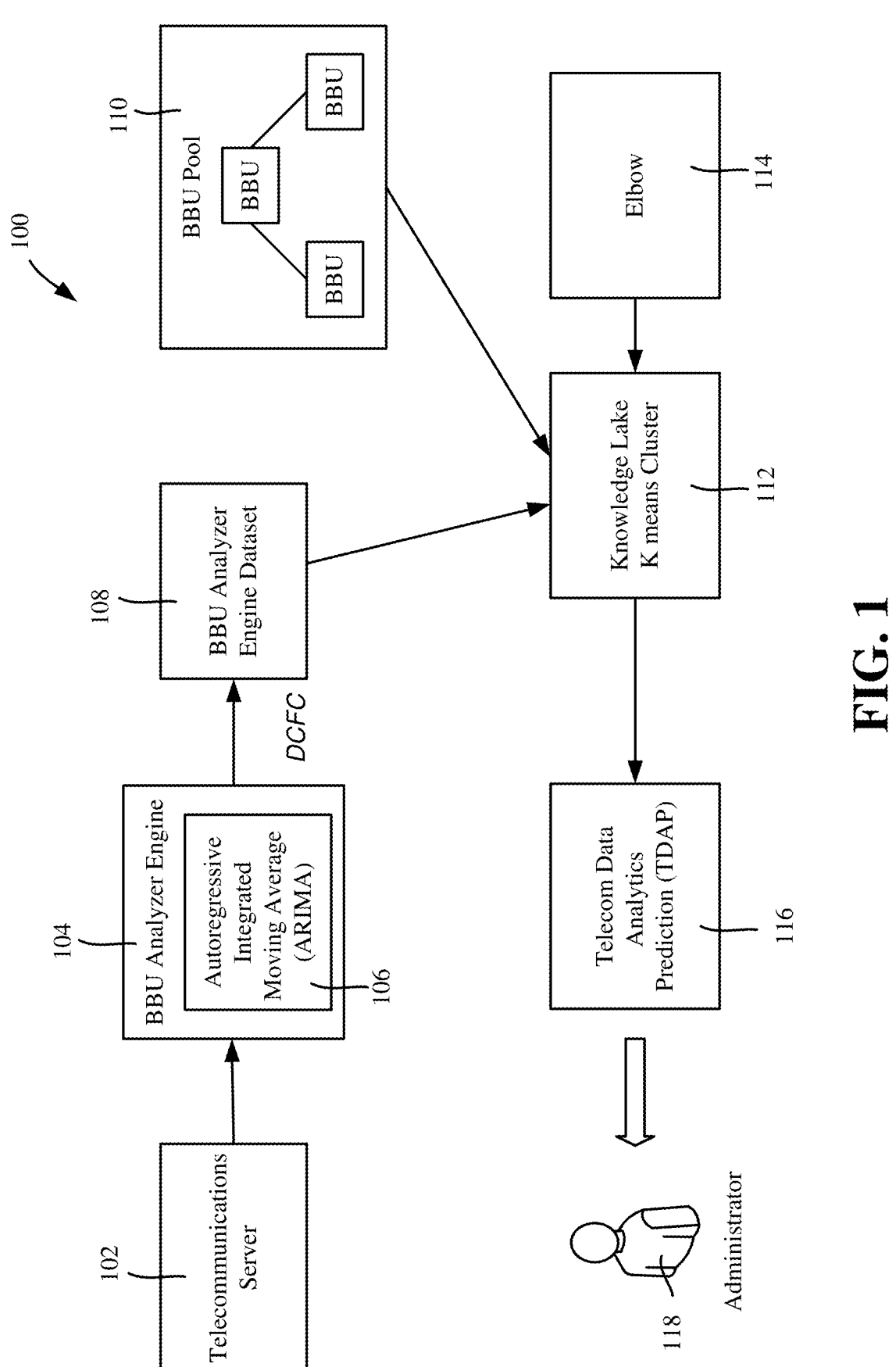
FIG. 1 is a block diagram showing an example system configured for clustering based on telecommunications data for forecasting, monitoring and/or maintaining server infrastructure, in accordance with various embodiments and implementations of the subject disclosure.

Various aspects of the technology described herein are generally directed towards collecting telecommunications data of a server infrastructure, such as performance parameter values/metrics of server resources. The information can be used for various use cases, including monitoring infrastructure servers/telecommunication baseband units in real-time, alerting an administrator in the event of one or more low performing baseband units in a C-RAN (cloud/centralized radio access network) network, maintaining the server infrastructure, and/or forecasting.

In one implementation, a real-time telecom statistics monitoring and alerting feature can be streamed and clustered (e.g., via k-means clustering) to manage the telecommunications server infrastructure in a C-RAN environment, dynamically providing an end-to-end solution, including to view and analyze the data center resources' behavior on a production or test environment. The technology described herein can be used to deliver a cloud-optimized server with near ideal performance for targeted telecommunications companies that operate the infrastructure servers.

It should be understood that any of the examples and/or descriptions herein are non-limiting. Thus, any of the embodiments, example embodiments, concepts, structures, functionalities or examples described herein are non-limiting, and the technology may be used in various ways that provide benefits and advantages in computing and data processing in general.

Reference throughout this specification to "one embodiment," "an embodiment," "one implementation," "an implementation," etc. means that a particular feature, structure, characteristic and/or attribute described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, characteristics and/or attributes may be combined in any suitable manner in one or more embodiments/implementations. Repetitive description of like elements employed in respective embodiments may be omitted for sake of brevity.

The detailed description is merely illustrative and is not intended to limit embodiments and/or application or uses of embodiments. Furthermore, there is no intention to be bound by any expressed or implied information presented in the preceding sections, or in the Detailed Description section. Further, it is to be understood that the present disclosure will be described in terms of a given illustrative architecture; however, other architectures, structures, materials and process features, and steps can be varied within the scope of the present disclosure.

It also should be noted that terms used herein, such as "optimize," "optimization," "optimal," "optimally" and the like only represent objectives to move towards a more optimal state, rather than necessarily obtaining ideal results. For example, an optimized number of clusters k refers to a k value determined using a particular technique as described herein, rather than necessarily achieving an optimal result that at different technique may determine. Similarly, "maximize" means moving towards a maximal state (e.g., up to some processing capacity limit), not necessarily achieving such a state, and so on.

The following detailed description is merely illustrative and is not intended to limit embodiments and/or application or uses of embodiments. Furthermore, there is no intention to be bound by any expressed or implied information presented in the preceding sections, or in the Detailed Description section.

One or more example embodiments are now described with reference to the drawings, in which example components, graphs and/or operations are shown, and in which like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details, and that the subject disclosure may be embodied in many different forms and should not be construed as limited to the examples set forth herein.

FIG. 1 shows an example system 100 including a telecommunications server 102 (at least one) from which time series data is collected in a first stage. In this example, the data can include performance parameter datapoints collected from one or more baseband units (BBUs), however any server infrastructure/resources for which time series parameter data (e.g., CPU utilization, memory utilization, network resource utilization and so on) can be collected can be used for a given scenario, and the technology described herein is not limited to baseband units.

In the example of FIG. 1, the time series data is input into a BBU analyzer engine 104, e.g., associated with a baseboard management controller. The BBU analyzer engine 104 is an end-to-end analytics engine that uses (e.g., incorporates or is coupled to) an autoregressive integrated moving average (ARIMA) model 106 (or other time series data statistical analysis model) to forecast server performance data, such as related to CPU, memory, storage, throughput, bandwidth, processing speed, and the like, such as on regular time intervals, including to find autocorrelations between the telecommunications data. In one implementation, this information is collected periodically from each server-user level using a baseboard management controller passthrough channel.

Thus, the telecommunications data can be collected and monitored periodically for decision making, and server statistics (e.g., in each BBU) are maintained locally, such as across a C-RAN (cloud/centralized radio access network) environment. Note that the BBU servers that are part of a C-RAN have the telecom information at the baseband management controller level, whereby baseband management controllers (servers) in the C-RAN network have the capability to expose the information concerning the BBU performance. The output of this first stage is collected and stored in the form of a BBU analyzer engine dataset 108 (e.g., a comma separated value (CSV) pattern such as dataset.csv), which is further used as input data parameter for a data analytics engine, as described with reference to FIG. 2.

As shown in FIG. 1, this dataset 108, along with real time (e.g., recent) BBU data of a baseband unit pool 110, is maintained in a knowledge lake 112. In general, the knowledge lake 112 is a data cluster/clustering model that forms the server clusters as described herein.

To measure the model, in a second stage the real-time forecasted data obtained via a data collector and forecasting channel (DCFC) is divided into train and test datasets. A test model is obtained from the dataset output that was obtained in the first stage. The training data is used to train the model, using a k-means unsupervised model with the historical data.

In one implementation, k-means clustering is performed on the recent server infrastructure (e.g., BBU telecom) data. A general objective is to perform the server infrastructure clustering in order to gain insights into the recent server infrastructure data, predict the quality of service in the form of clusters, enhance the customer experience at any given point of time, and/or make data-driven business decisions to standardize the server infrastructure, e.g., to help telecommunications companies who operate the networking equipment.

Figure 5A:
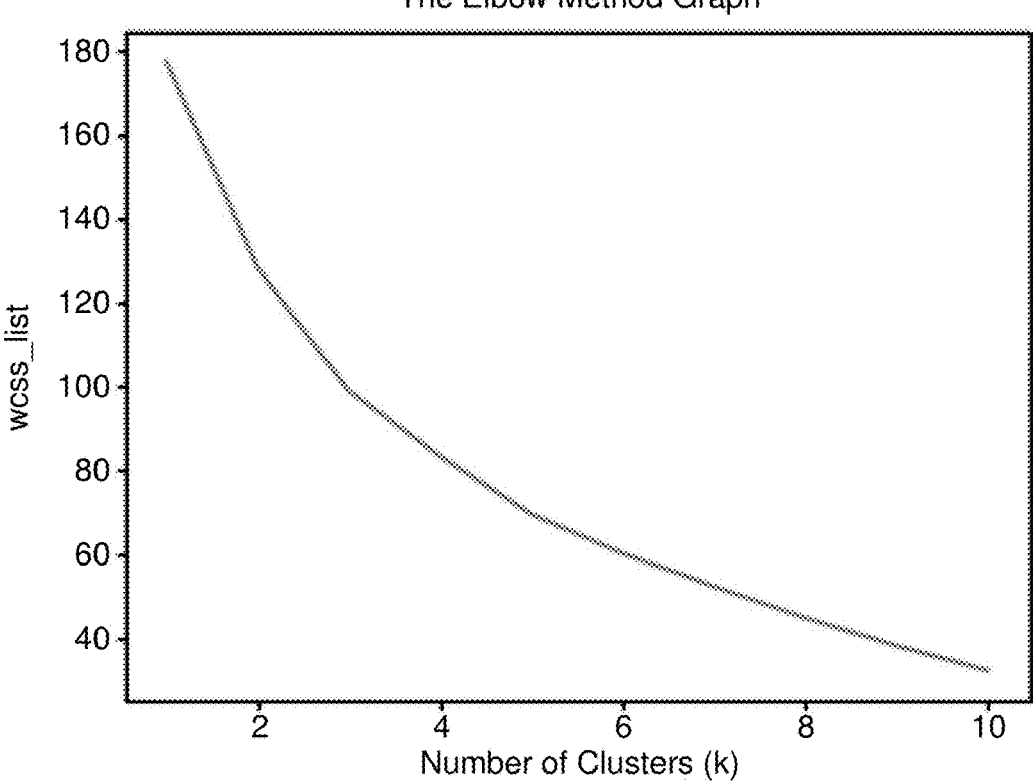
FIG. 5A is an example graphical representation of determining an optimal number of clusters to use in clustering of datasets based on an elbow point in an elbow curve (the elbow method), in accordance with various embodiments and implementations of the subject disclosure.

In one implementation, k-means clustering operates by first determining the optimal value of k, employing the elbow method 114, which in general is a graphical method for finding the optimal number of clusters (the k value) in a k-means clustering model. An elbow curve (e.g., FIG. 5A) represents the within-cluster-sum-of-square (WCSS) values on the y-axis that correspond to the different candidate values of k (on the x-axis). More particularly, FIG. 5A depicts an example elbow curve graph obtained while plotting each WSSS value obtained against the k-value given at that time to determine the optimal number k of clusters via this elbow method graph; the optimal k value is the point at which the graph forms an elbow.

Thus, the elbow method involves calculating the within-cluster sum of square (WCSS) values for various values of k within a specified range. Briefly, WCSS is defined as:

Given a set of data points $\{x_1, x_2, \ldots, x_n\}$ and their corresponding cluster centroids $\{c_1, c_2, \ldots, c_k\}$, where k is the number of clusters, the WCSS is calculated as the sum of the squared Euclidean distances between each data point and its assigned cluster centroid:

$$WCSS = \sum_{i=1}^{n} \sum_{j=1}^{k} \|x_i - c_j\|^2.$$

Here, $x_i$ represents a data point, $c_j$ represents a cluster centroid, $|\ldots|$ denotes the Euclidean distance, and the inner summation is taken over all the cluster centroids for each data point. The outer summation is taken over all the data points in the dataset.

In general, the goal of the k-means k-value determination is to minimize the WCSS by finding the relative best clustering configuration with the appropriate number of clusters (k). To make the process more efficient, a smoothing filter (e.g., the Savitzky-Golay filter) can be employed, which smooths the curve, enabling identifying of the rate of change to locate the point where the rate of change is the highest.

Once the clustering model is trained/tested, and the number of clusters k is determined, real time/recent data from a server infrastructure (e.g., a BBU cluster server/pool 110) is processed by the knowledge lake 112 to obtain the k clusters. In other words, the output of the knowledge lake 112 is k clusters of server/network resource datasets, where each dataset represents performance parameter values for a server/virtual machine. These datasets are processed by a telecom data analytics prediction (TDAP) engine 116, which can comprehensively show how data in a cluster is distributed at any given point of time. In the event that the telecom data analytics prediction engine 116 identifies an issue, e.g., in the BBU cluster server performance, the engine 116 can output an alert, e.g., to a telecommunications administrator 118, e.g., highlighting the appropriate issue/action.

Figure 2:
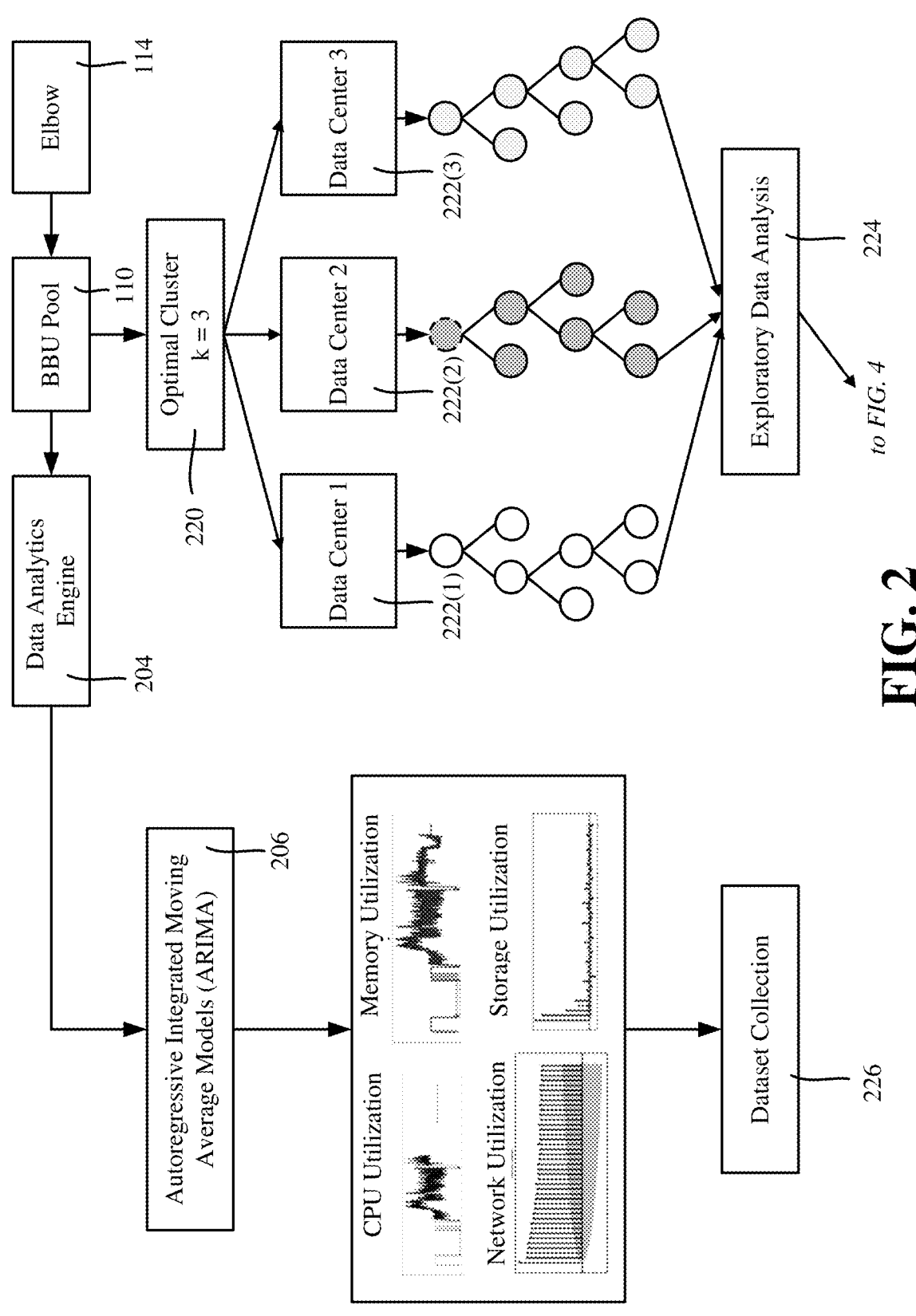
FIGS. 2 and 3 comprise a block diagram showing an example of how the data of baseband unit (BBU) devices can be clustered for data analysis, in accordance with various embodiments and implementations of the subject disclosure.
Figure 3:
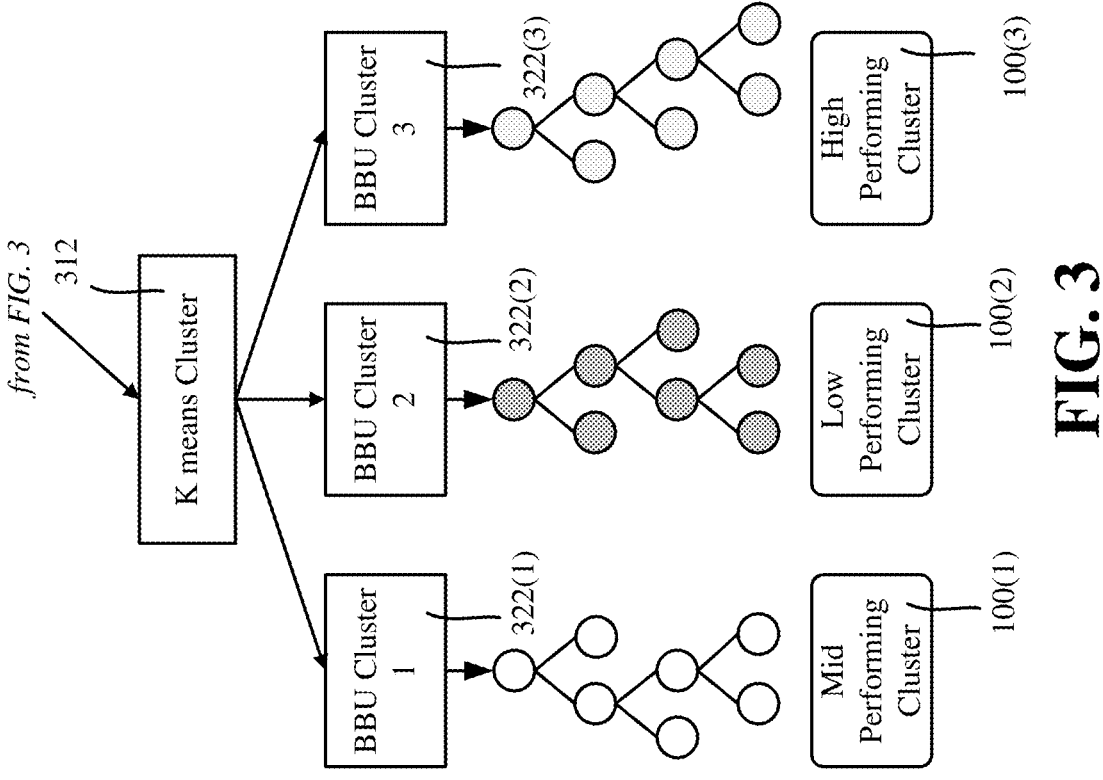

FIGS. 2 and 3 provide additional details in the form of a BBU pool 110 example. Consider that in this example, the elbow method 114 is used with the BBU data (e.g., real-time data gathered from BBU servers that captures performance-related metrics such as CPU usage, memory utilization, storage, network and GPU parameters). This recent data is used to determine the optimal number of clusters, e.g., k=3 (block 220). The result of clustering with k=3 corresponds to clustered datasets in this example, represented as data centers 222(1)-222(3), which can be processed for exploratory data analysis (block 224).

As shown in FIG. 3, the three clusters 322(1)-322(3) of datasets can be analyzed. For example, analysis (as described herein) can determine that the clusters 322(1), 322(2) and 322(3) correspond to a mid-performing cluster (block 324(1)), a low performing cluster (block 324(2)) and a high performing cluster (block 324(3)), respectively.

Returning to FIG. 2, in addition to clustering for analysis, the time series data from the BBU pool is input to a data analytics engine 204, e.g., as a .csv pattern, which uses ARIMA or a similar model to obtain collected data in dataset collection 226. This dataset collection 226 can be added to the knowledge lake 112 (FIG. 1), for use as further test data/training data, so that clustering can continue to improve as more and more data is accumulated over time.

Figure 4:
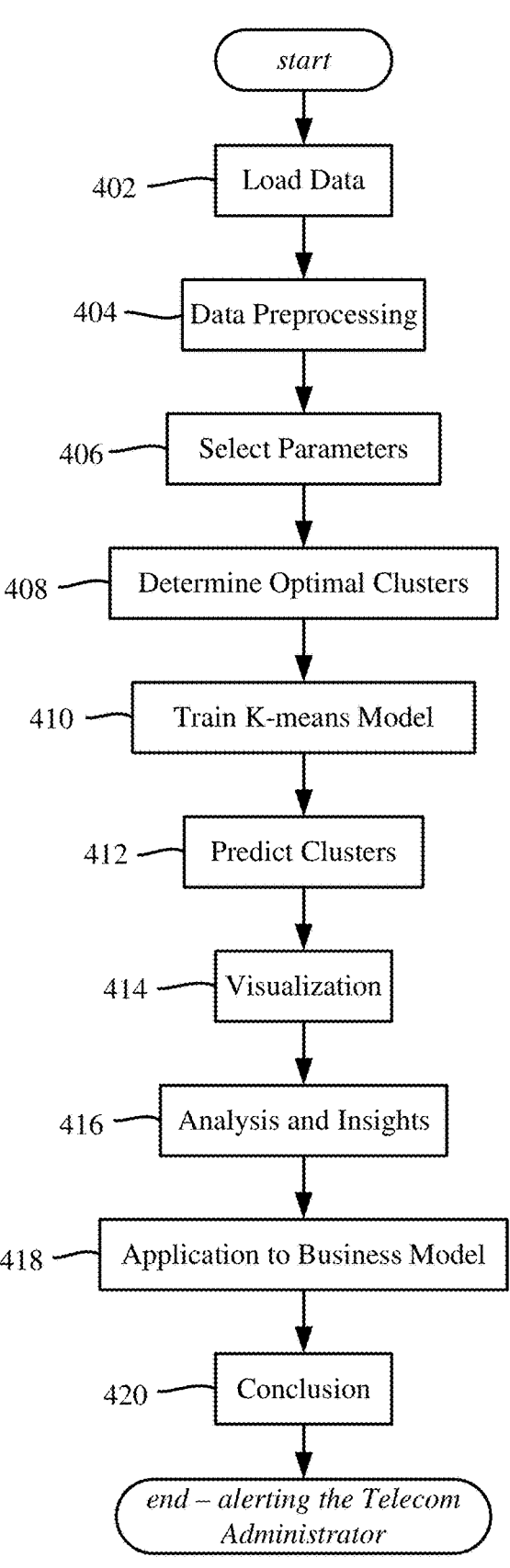
FIG. 4 is a flow diagram showing example operations related to clustering based on telecommunications data for facilitating the taking of an action based on clustered datasets, in accordance with various embodiments and implementations of the subject disclosure.

FIG. 4 summarizes various operations related to performing the server clustering based on loading the collected telecommunications data at operation 402, preprocessed by operation 404, which is to be used for predicting the quality of clusters with respect to the data center components/resources. Note that in one implementation, equal weightage is assigned to each performance parameter; further, to ensure that the parameters contribute equally to the model's analysis, standard scaling is used. More particularly, before feeding the data into the model, data pre-processing at operation 404 applies standard scaling to the collected performance data metrics. This scaling process centers each parameter around its mean, effectively eliminating variations in scale. As a result, the parameters can be evaluated on a level playing field, as none can dominate the analysis due to its magnitude. By standardizing the data in this manner, each parameter's contribution to the model is fair and balanced, which enhances the accuracy and reliability of any insights, enabling the making of well-informed decisions.

Operation 406 selects the desired parameters from the data. Operation 408 represents determining the optimal number of clusters k, e.g., using the elbow method described herein. Operation 410 represents training the k-means model, which is then used to predict the clusters (operation 412).

These predictions, which can be output as visualization data (operation 414) as described herein, can be analyzed to help telecommunications companies better understand their infrastructure to obtain insights (operation 416). Such insights can be used to make business related decisions applied to their business model (operation 418), e.g., by adding or removing server components/resources, for example. A conclusion operation 420 is shown which represents taking an action to this end, such as to alert the administrator as to what to do based on the insights.

In addition to monitoring the server infrastructure parameters for maintaining (e.g., modifying the resources of) the server infrastructure, the time series data can be used for prediction. Thus, for example, there may be a trend in which memory utilization is increasing in a given server/group of servers as represented by a clustered dataset, whereby proactive action can be taken to increase the amount of memory for that server/serve group.

To make these insights more accessible to end-users, a process for visualizing the second stage output data as comparisons of different input parameters is provided, which graphically presents the clustered server configurations in straightforward two-dimensional plots. Each plot showcases various pairs of distinct parameter values, providing a clear and intuitive representation of server performance and resource allocation. Example real time data determined by the model result in different plots/visualizations shown in FIGS. 5B-19.

In FIGS. 5B-19, the numerically labeled circles (datapoints) represent the clusters, which were optimally determined to be k=6 for this input data. Each slightly larger circle labeled as "C" represents the centroid for one of the clusters, that is, there are six centroids in each visualization. Note that in one alternative implementation, instead of or in addition to labeling the datapoints, each cluster and the centroids can be represented by different colors to facilitate improved visualization. Further, the parameter values are shown having had standard scaling applied as described with reference to operation 404 of FIG. 4; e.g., the number of users parameter value is represented by normalized values that range from −2.5 to 1.5. If desired, actual numbers can be obtained for viewing in a separate process, e.g., to determine possible future problems, such as an extremely high (actual) percentage memory utilization, which if not addressed, may result in slow performance or possibly a system crash.

Figure 5B:
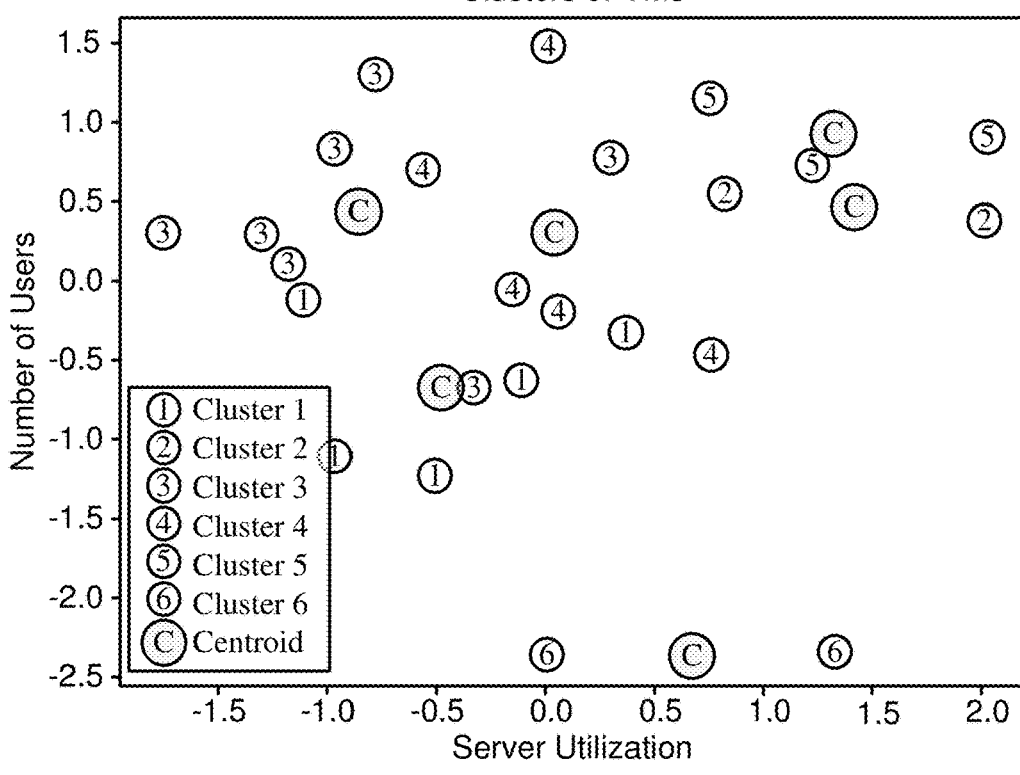

In FIG. 5B, the visualization shows the number of users versus server utilization. As shown in this comparison, Cluster 3 stands out as having very low server utilization with a large number of users, as evident from the plot. Indeed, Cluster 3 stands out significantly with an interesting pattern that shows an unusually low server utilization despite having a notably high number of users. The data in Cluster 3 thus presents an intriguing scenario, where a large number of users are making use of the system, but the servers are not being fully utilized. This contrast between user activity and server usage may indicate potential inefficiencies or optimizations that may need to be addressed in the system; an alert can be issued, for example. Further investigation into the reasons behind this discrepancy in Cluster 3 can help in identifying opportunities for better resource allocation and overall system performance enhancement.

Figure 6A:
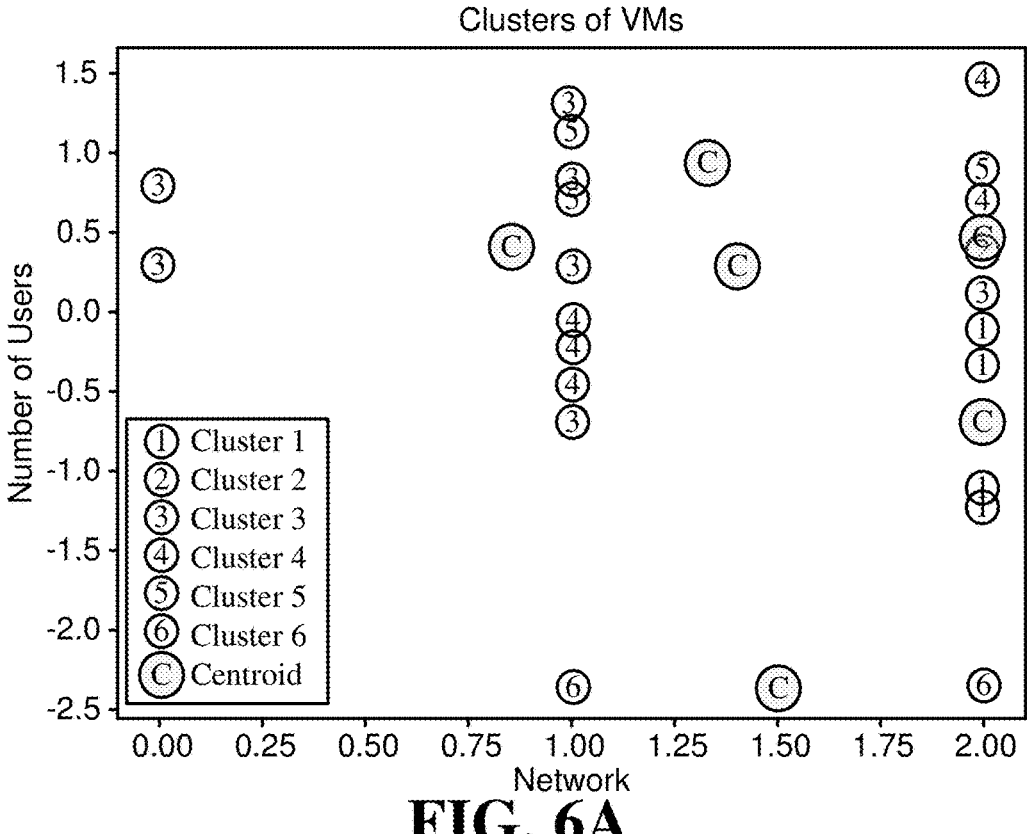

FIG. 6A shows the number of users versus network, (where network utilization can be determined from bandwidth, latency and other network-related parameters). As can be seen, in each network an almost equal number of users are divided up.

Figure 6B:
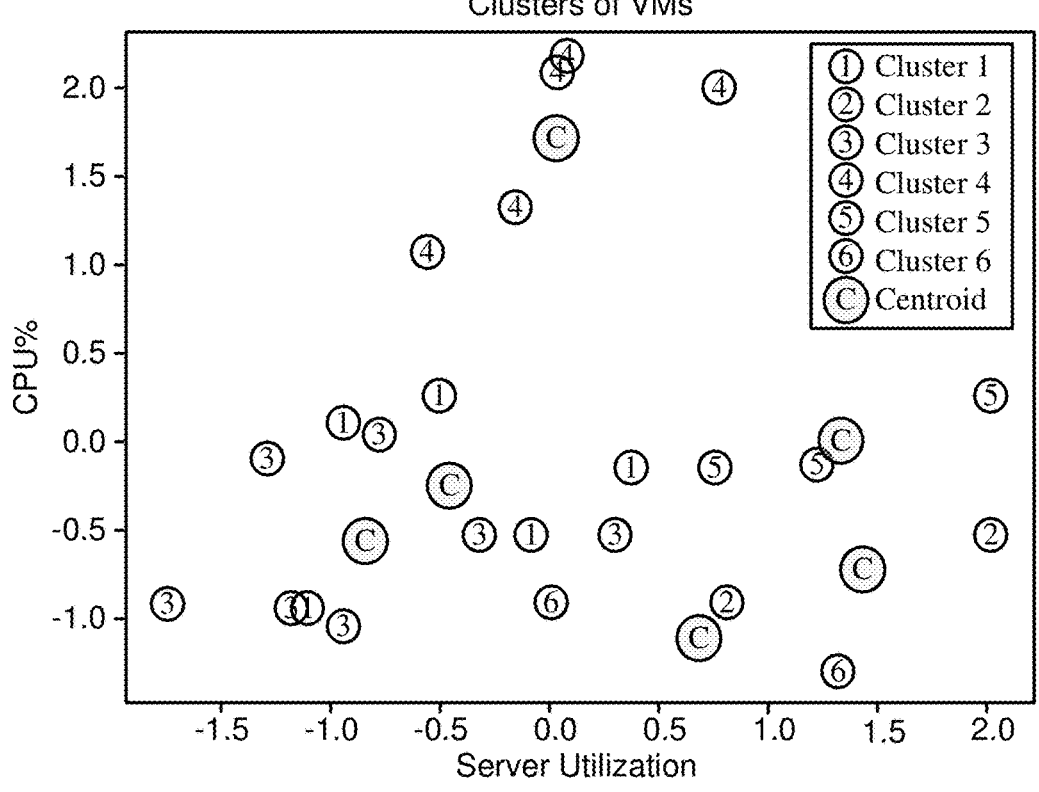

FIG. 6B shows CPU percentage (%) utilization versus server utilization. From this plot it can be deduced that Cluster 3 is a poor performing cluster with low CPU percentage utilization and low server utilization. Cluster 4 also performs poorly because it has mid server utilization but consumes CPU resources due to a higher level of CPU percentage utilization. Cluster 5 performs the relative best among the clusters with low CPU percentage utilization and high server utilization.

Figure 7A:
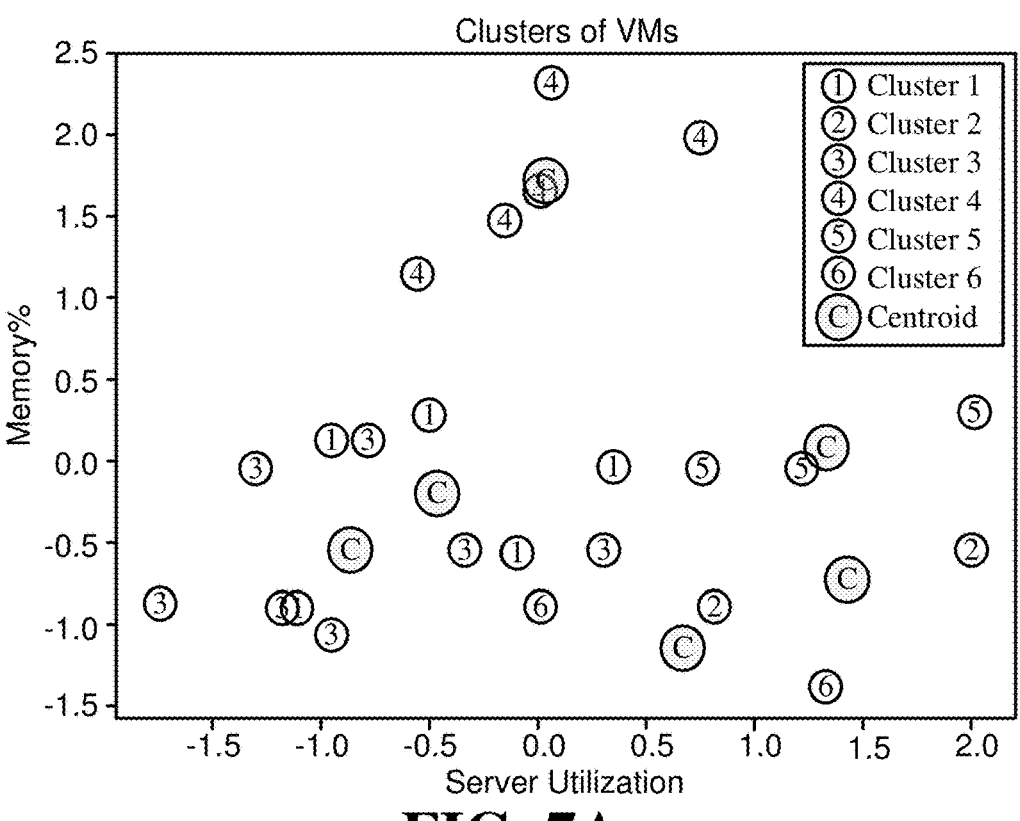

FIG. 7A plots memory percentage (%) utilization versus server utilization. As evident from the plot, Cluster 3 performs poorly with low memory percentage utilization and low server utilization, whereas Cluster 5 performs well with high server utilization and low memory percentage utilization.

Figure 7B:
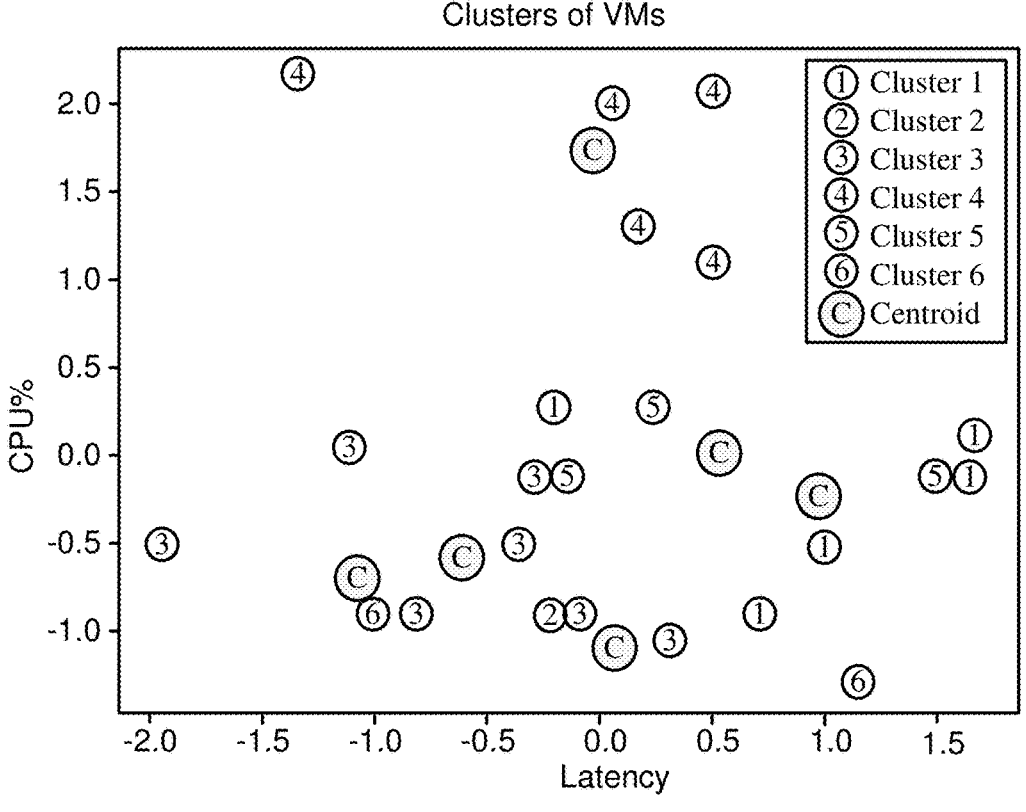

FIG. 7B shows CPU percentage utilization versus latency. Here it is seen that Cluster 5 performs well with low latency and less CPU percentage utilization.

Figure 8A:
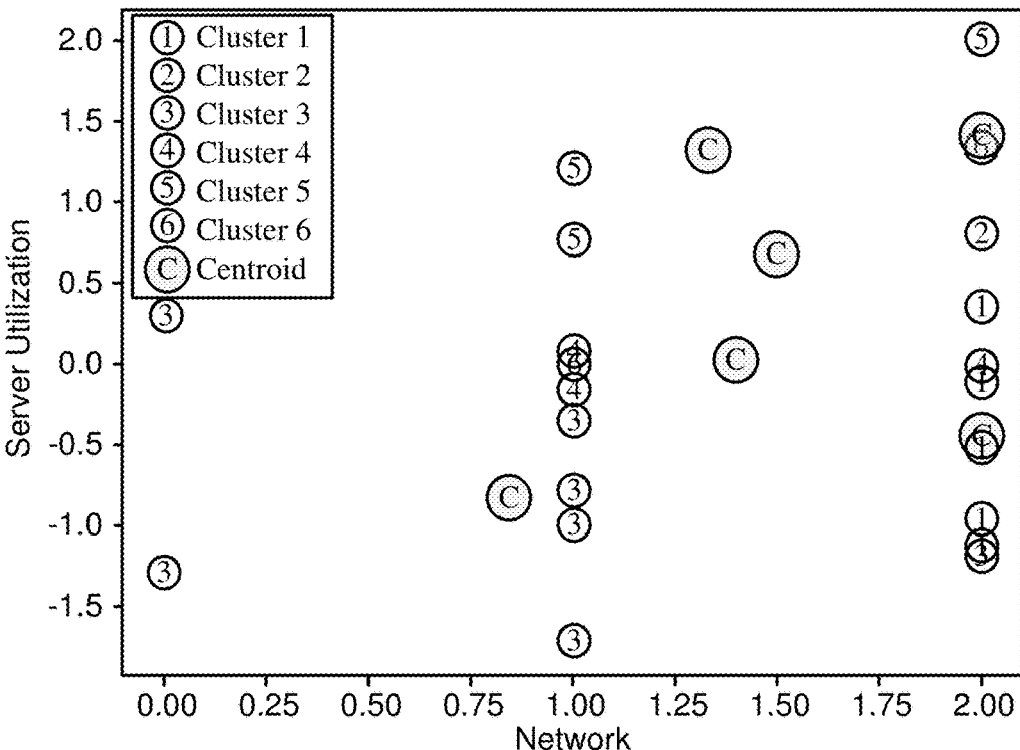
Figure 8B:
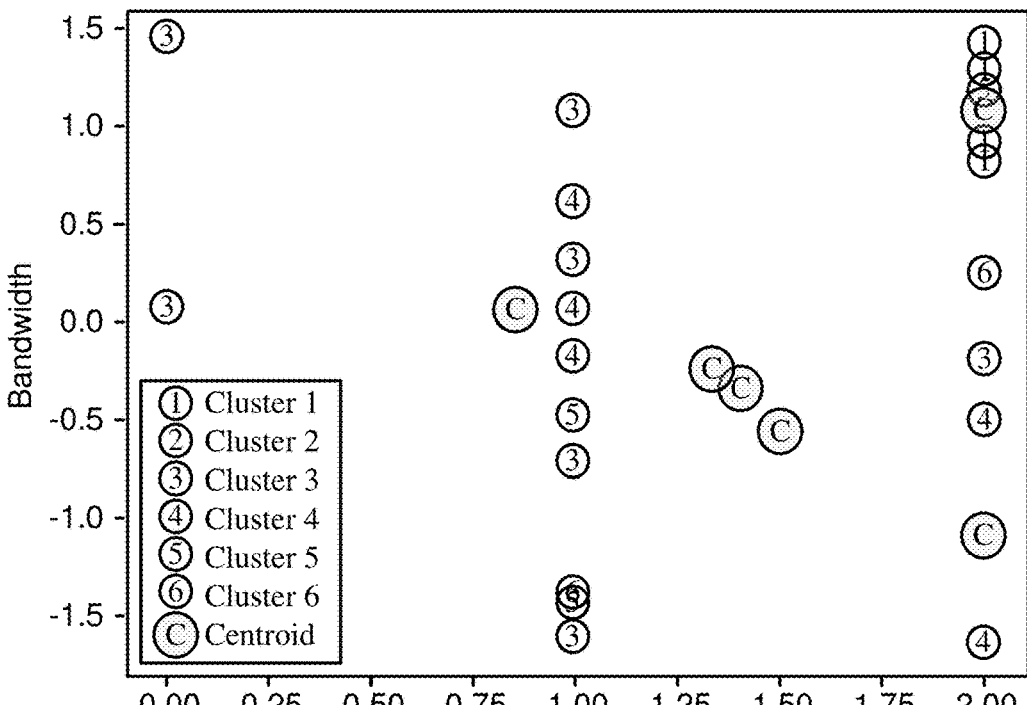

FIG. 8A plots server utilization versus network utilization, which indicates that each network consumes almost equal server utilization. FIG. 8B compares bandwidth versus network, which depicts that each network has consumed almost equal bandwidth.

Figure 9A:
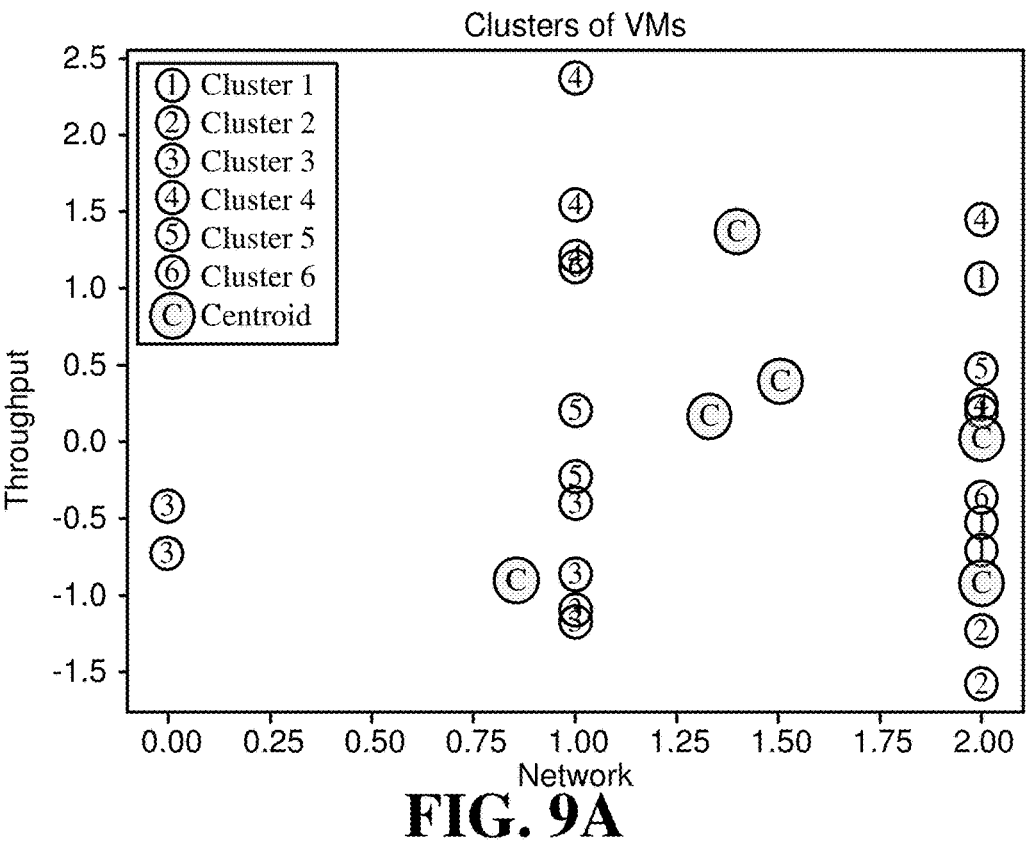
Figure 9B:
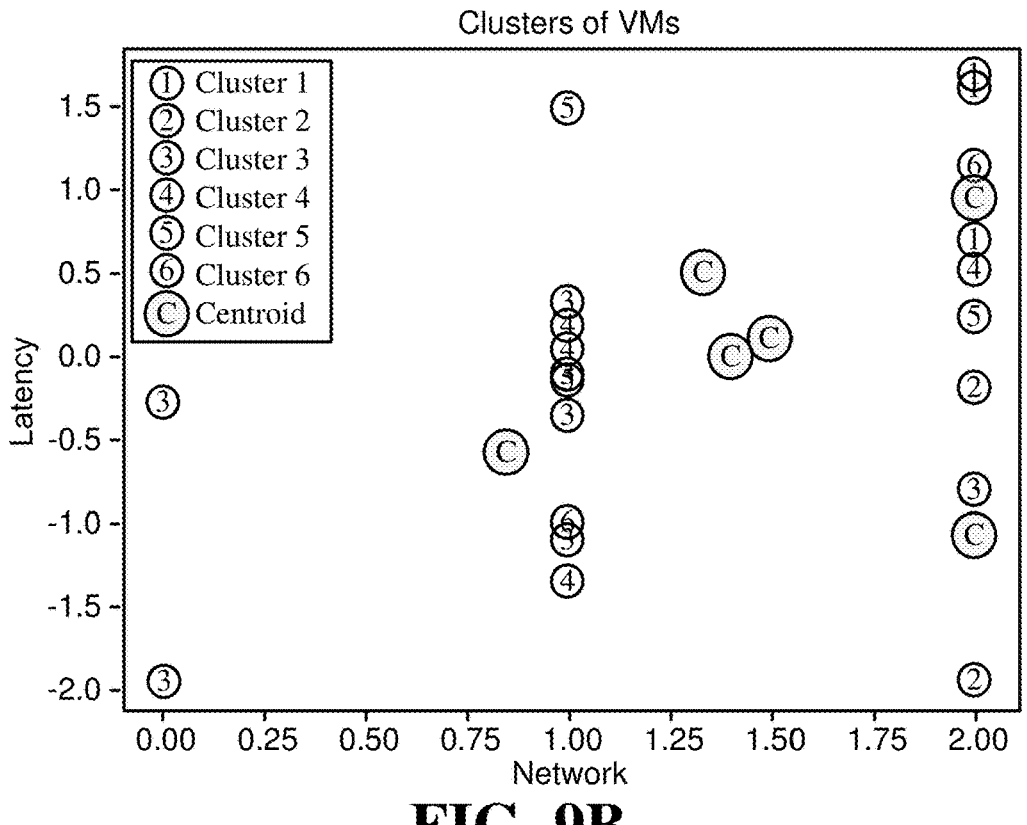

In FIG. 9A, throughput and network are compared, which depicts that each network consumed almost equal throughput. In FIG. 9B, latency and network are compared, from which it can be deduced that in all networks, there is generally uniformly latency distribution, with low, mid and high latency distributed almost equally.

Figure 10A:
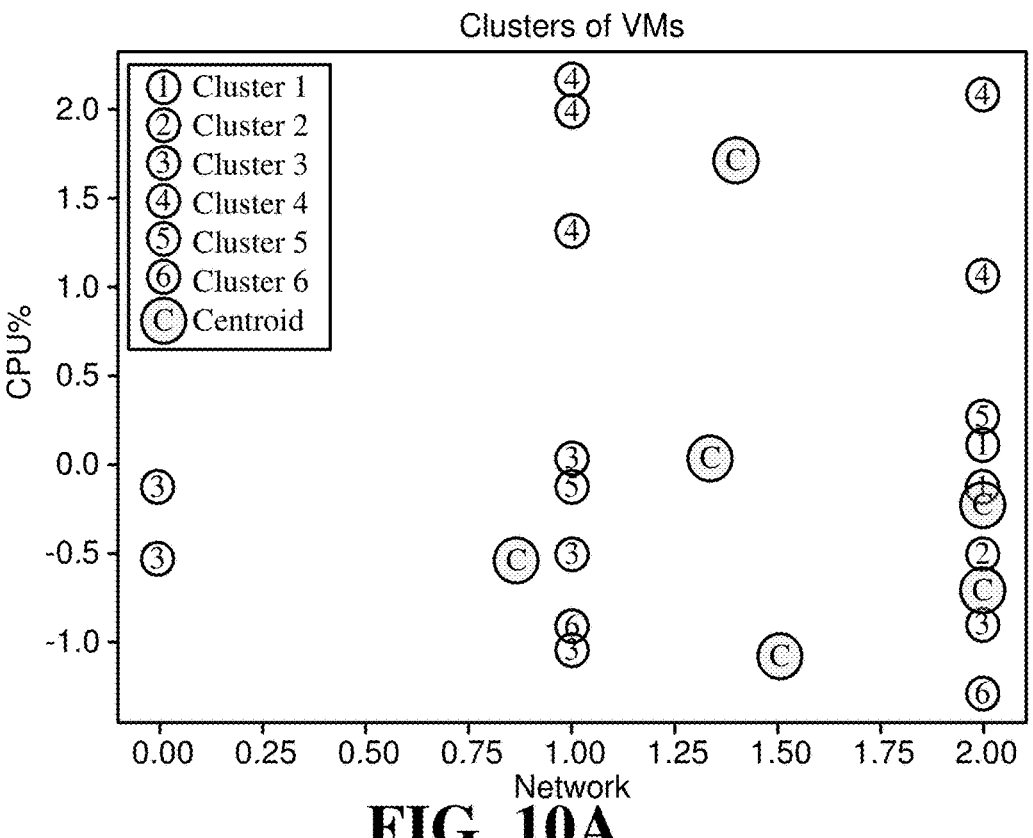
Figure 10B:
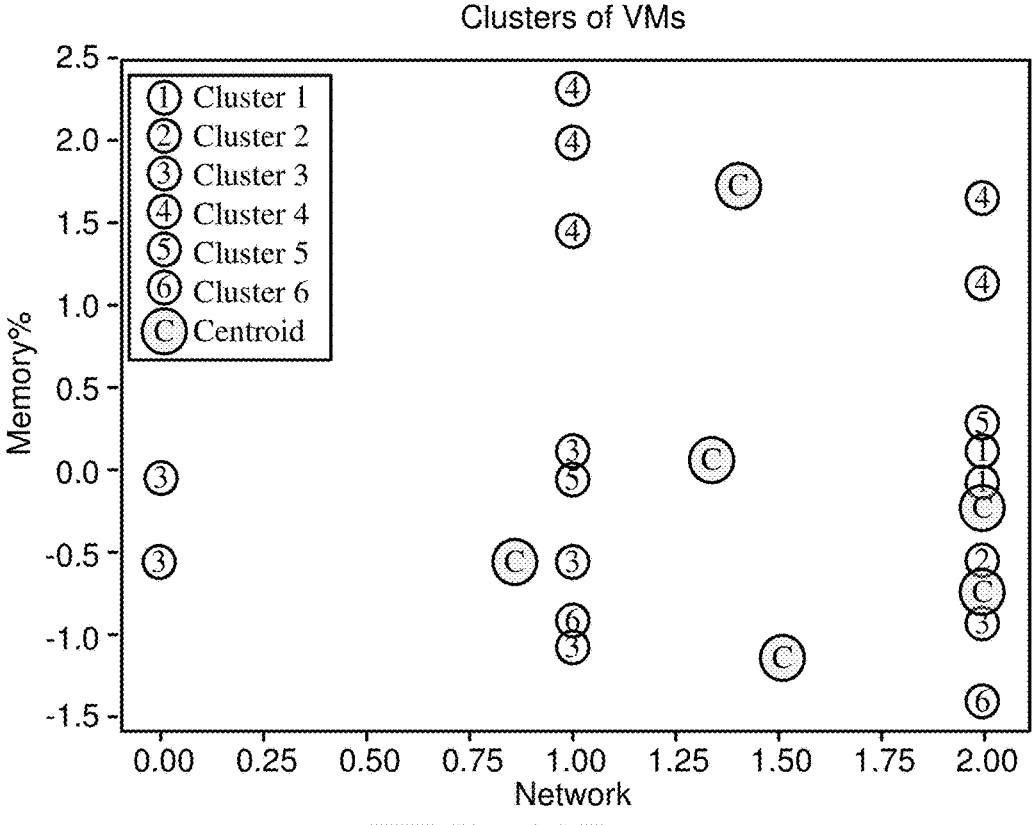

FIG. 10A compares percentage CPU utilization versus network, whereby visual analysis deduces that in the third cluster, most networks are consuming low CPU percentage utilization. In FIG. 10B, memory percentage utilization versus network is visually presented, from where it can be deduced that in the third network most are consuming low memory/have low memory percentage utilization.

Figure 11A:
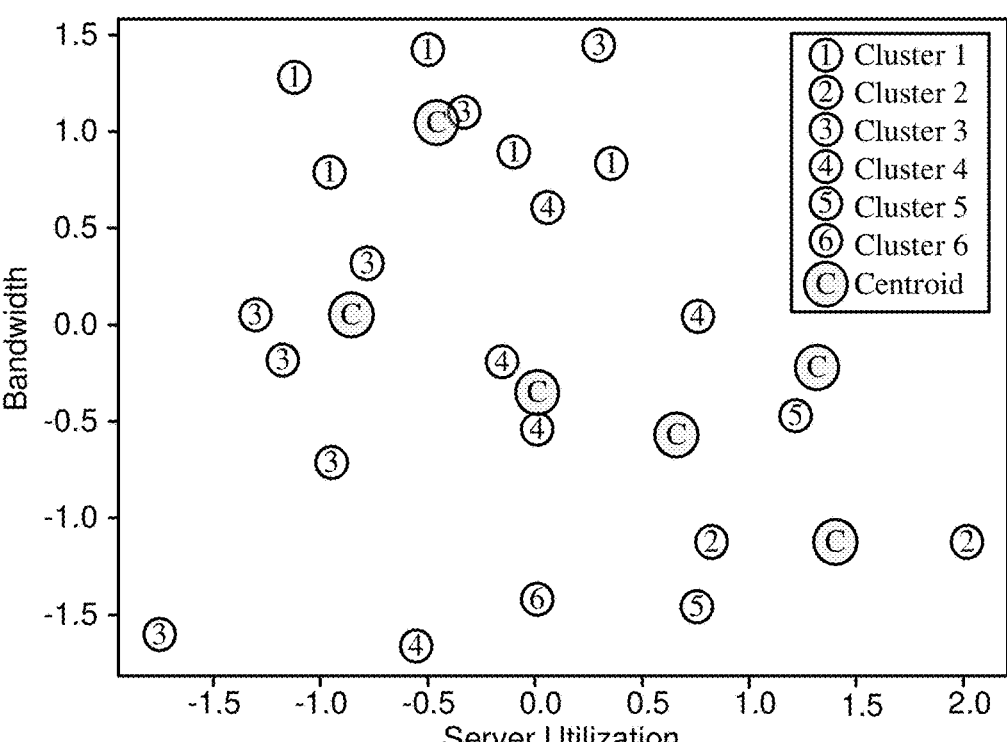

In FIG. 11A, bandwidth and server utilization are compared. As can be seen, Cluster 5 performs well with a combination of low bandwidth and high server utilization. However, Cluster 3 performs poorly, having low server utilization and high bandwidth.

Figure 11B:
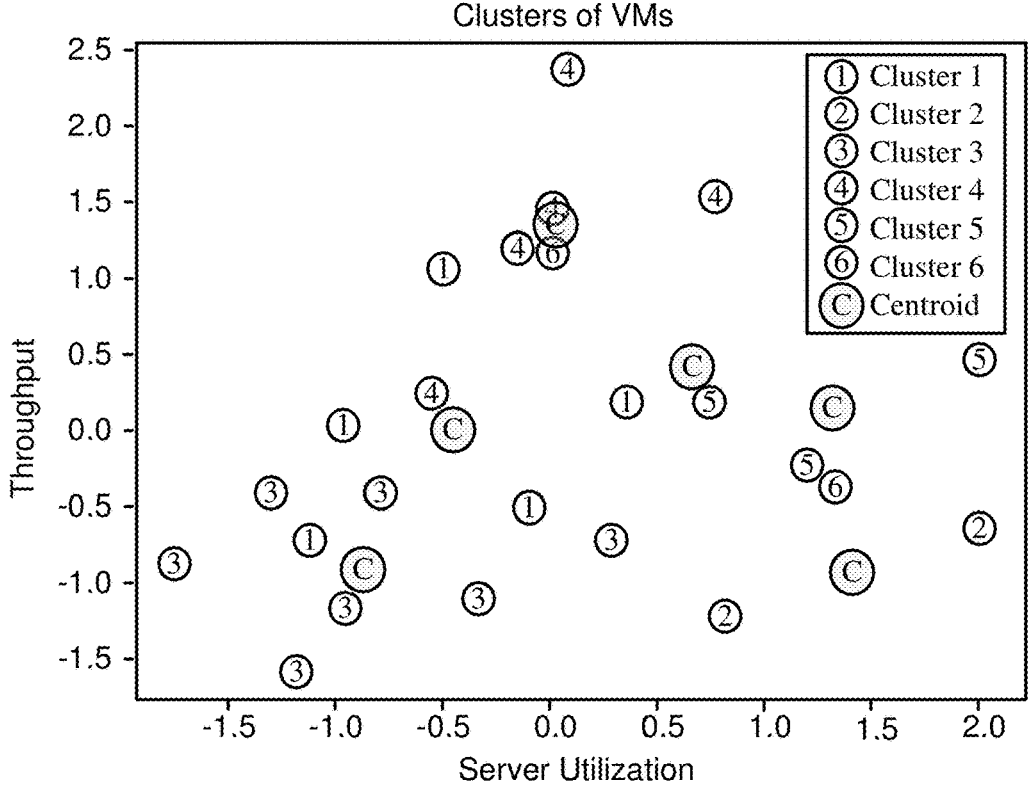

FIG. 11B shows throughput versus server utilization. Here, Cluster 5 performs well with high throughput and high server utilization. In contrast, Cluster 3 performs poorly with mid-to-high server utilization and low throughput.

Figure 12A:
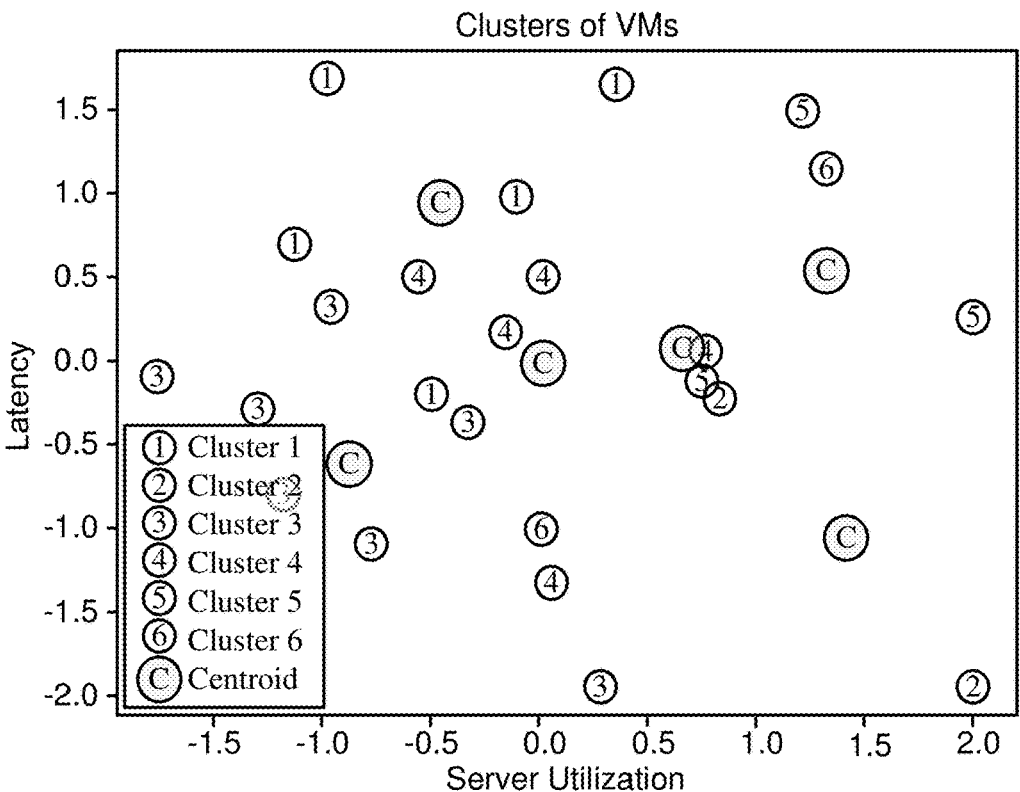
Figure 12B:
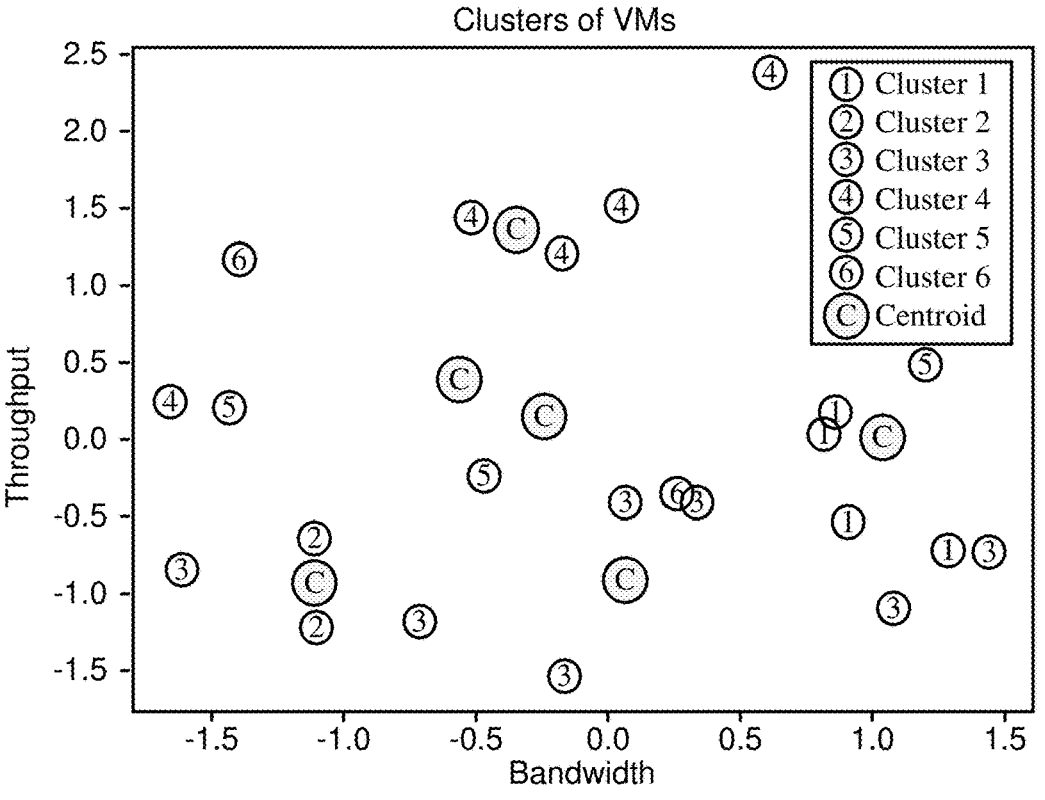

FIG. 12A depicts latency versus server utilization, in which it can be seen that Cluster 3 performs poorly with low server utilization and mid latency. FIG. 12B depicts throughput versus bandwidth; Cluster 3 performs poorly with low throughput in general.

Figure 13A:
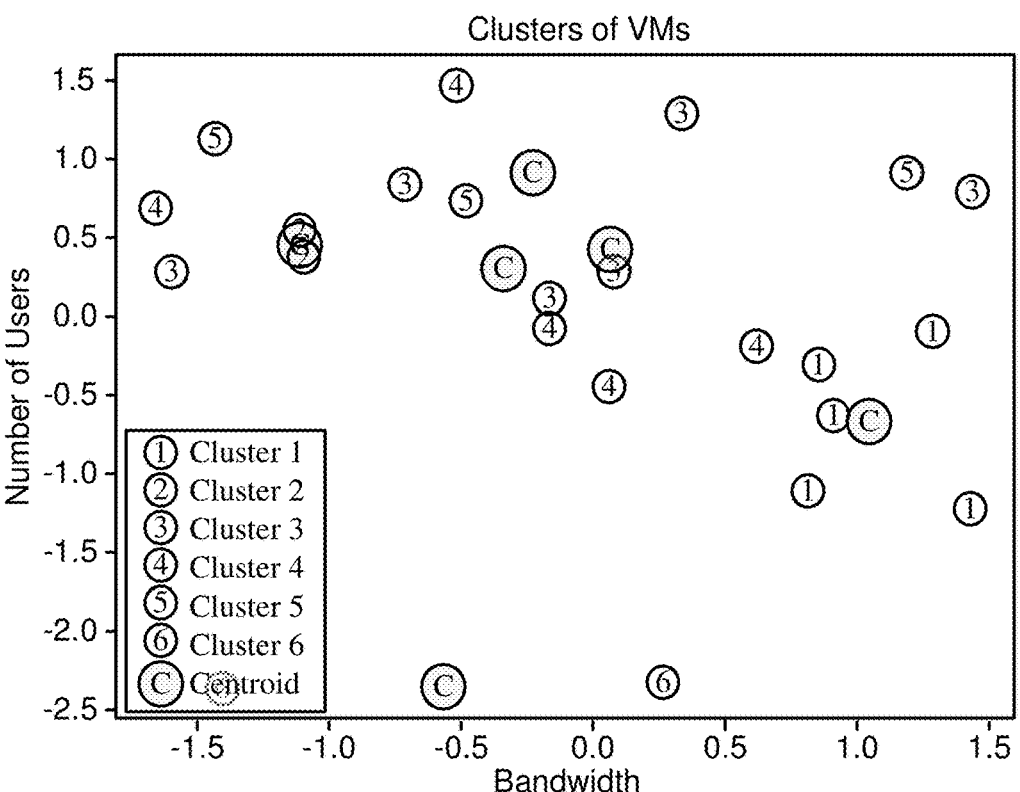
Figure 13B:
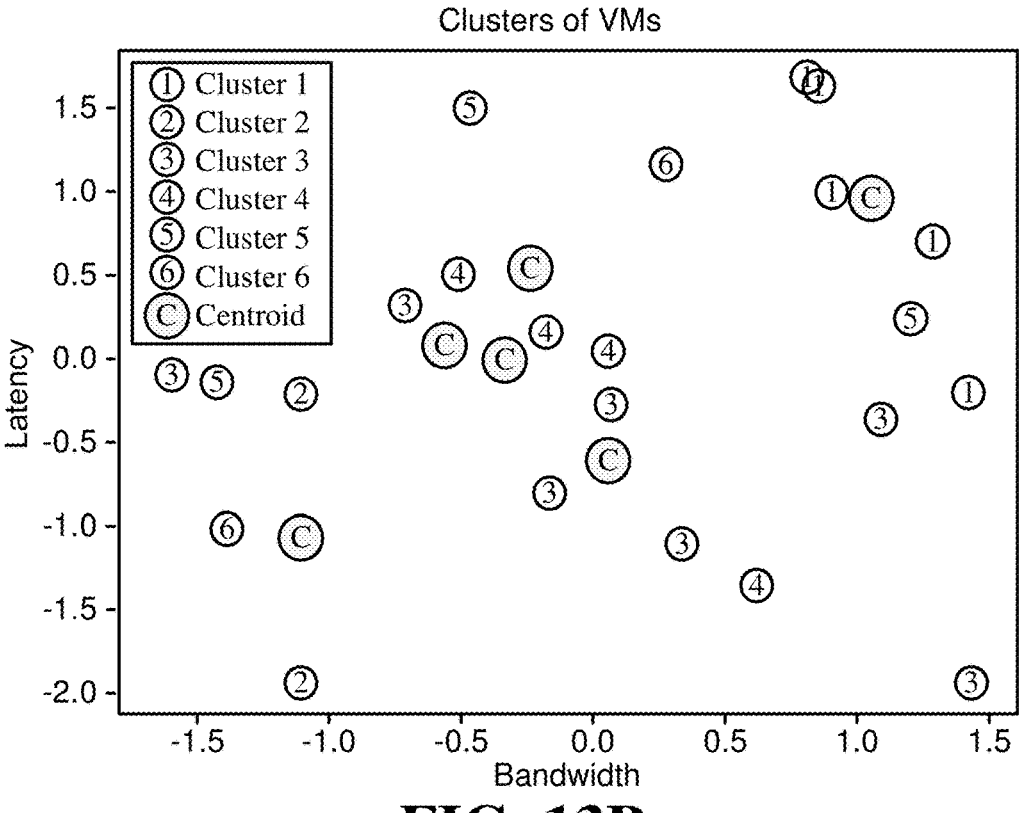

FIG. 13A compares the number of users versus bandwidth; nothing conclusive can be determined regarding any of the clusters from this plot. FIG. 13B compares latency versus bandwidth; this plot shows that for Cluster 4, almost all datapoints have medium bandwidth and medium latency.

FIG. 14A shows CPU percentage utilization versus bandwidth, from which it can be deduced that Cluster 5 performs well with low bandwidth as well as low CPU percentage utilization. FIG. 14B compares memory percentage utilization versus bandwidth, which shows that Cluster 5 performs well with low bandwidth in conjunction with low memory percentage utilization.

Figure 15A:
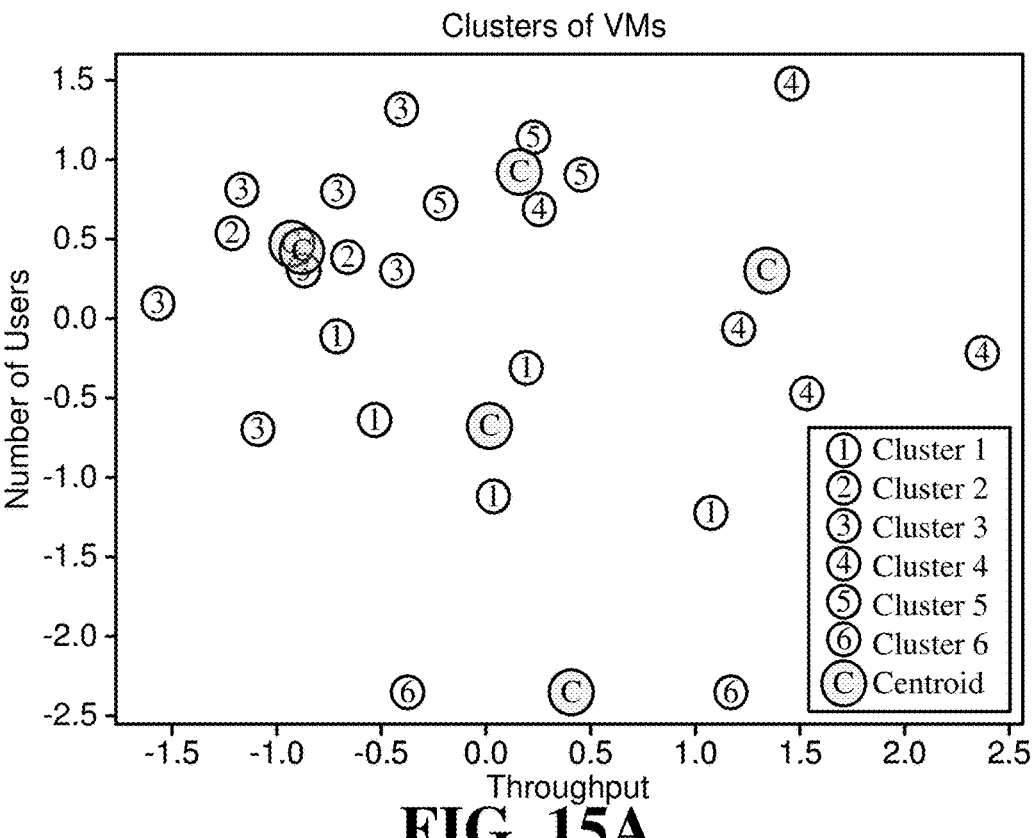
Figure 15B:
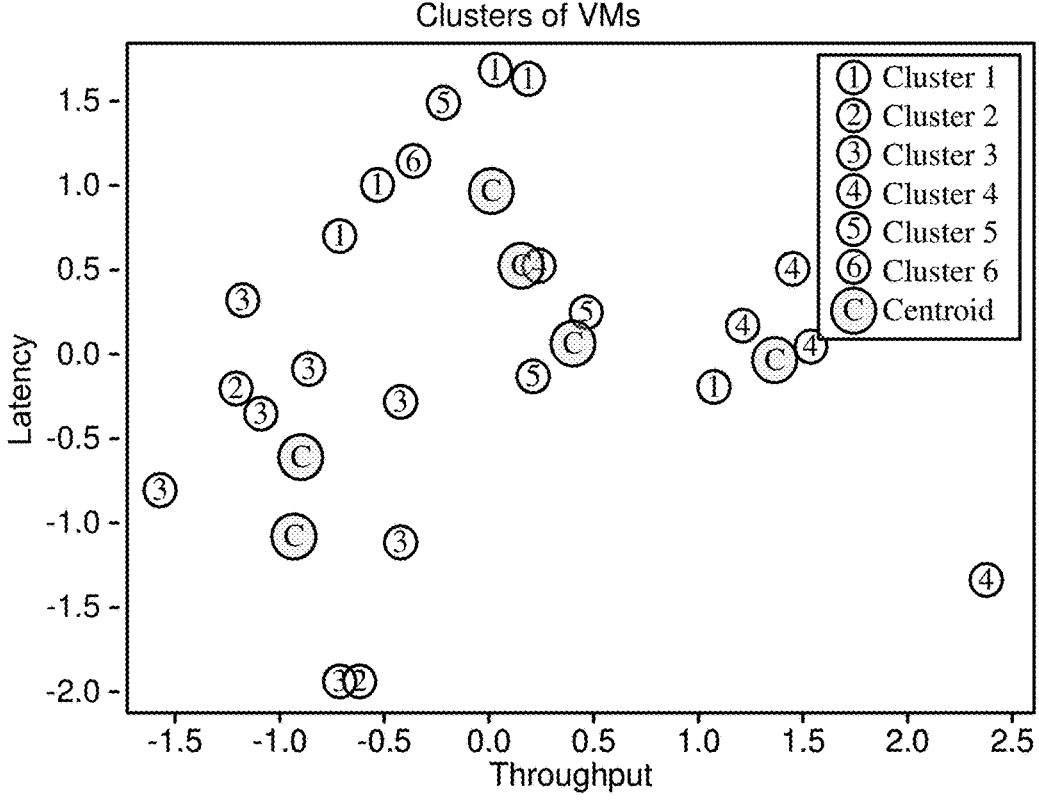

FIG. 15A depicts a comparison of the number of users versus throughput, which indicates that Cluster 4 performs the relative best with a medium number of users and high throughput. FIG. 15B represents latency versus throughput; this plot indicates that Cluster 3 performs quite poorly, with medium latency and very low throughput.

Figure 16A:
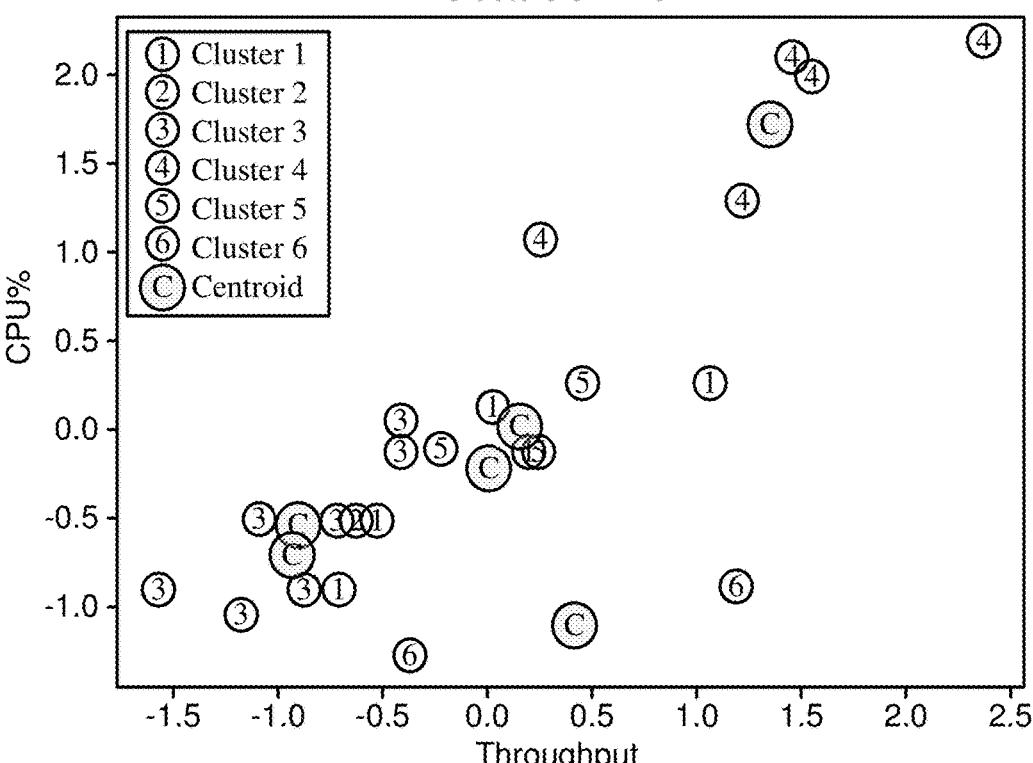
Figure 16B:
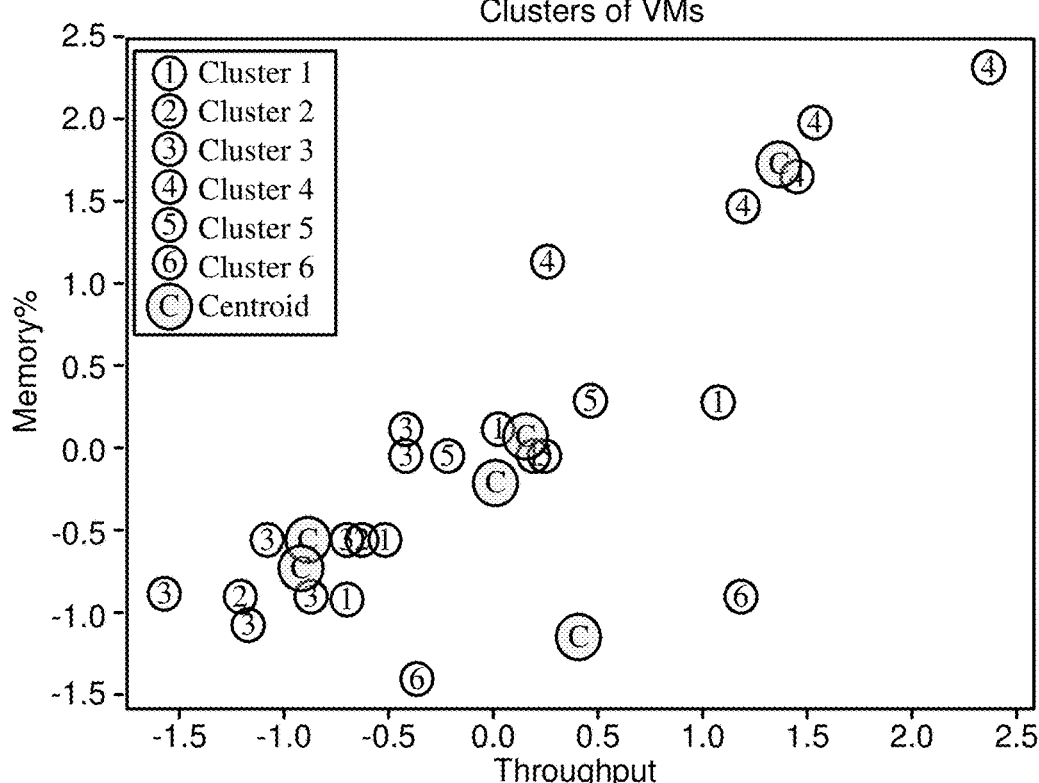

FIG. 16A compares CPU percentage utilization versus throughput, which shows that Cluster 5 performs the relative best, with medium throughput and medium CPU percentage utilization; for Cluster 5 there is no resource consumption imbalance with respect to these two performance parameters. FIG. 16B compares memory percentage utilization versus throughput. This plot shows that Cluster 5 performs the relative best with medium throughput and medium memory percentage utilization, again with no imbalance.

Figure 17A:
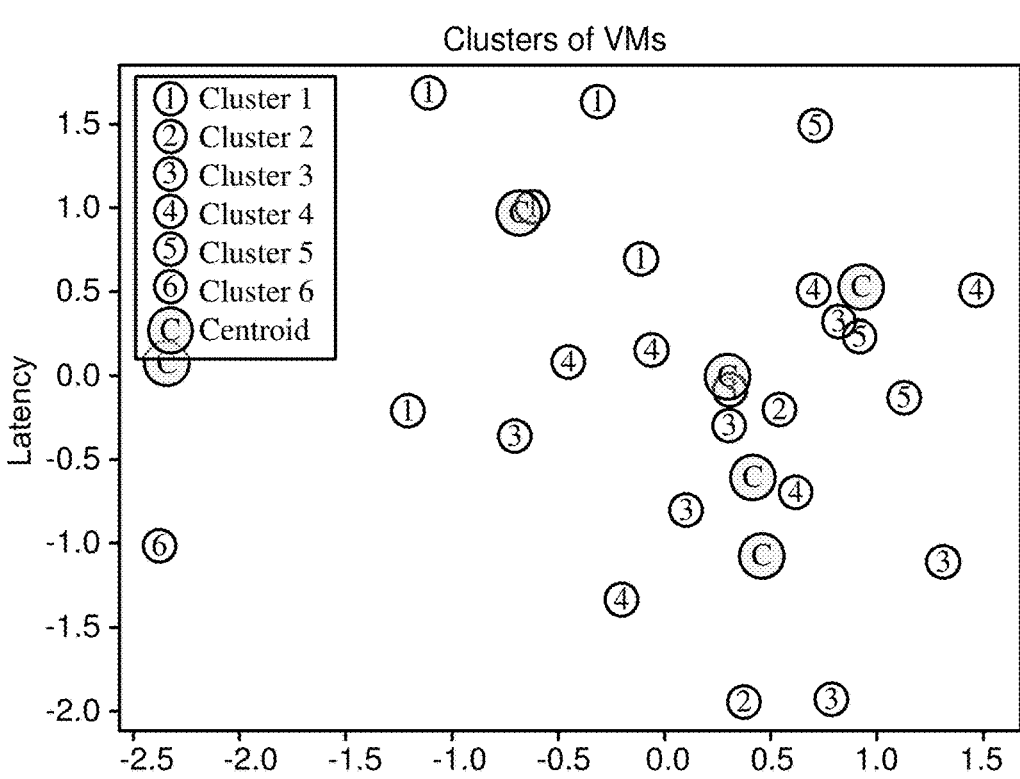
Figure 17B:
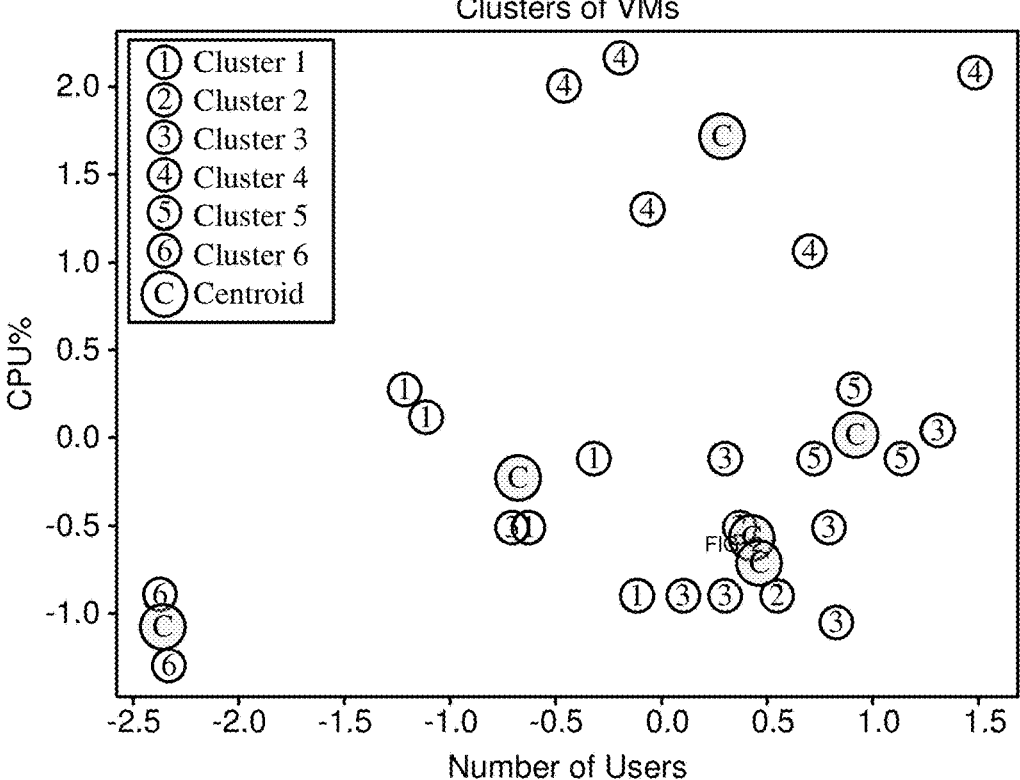

FIG. 17A plots latency versus the number of users; nothing conclusive can be discerned from this visualization. FIG. 17B plots CPU percentage utilization versus number of users; visual analysis indicates that Cluster 5 performs the relative best, with the highest number of users and mid-to-low CPU consumption.

Figure 18A:
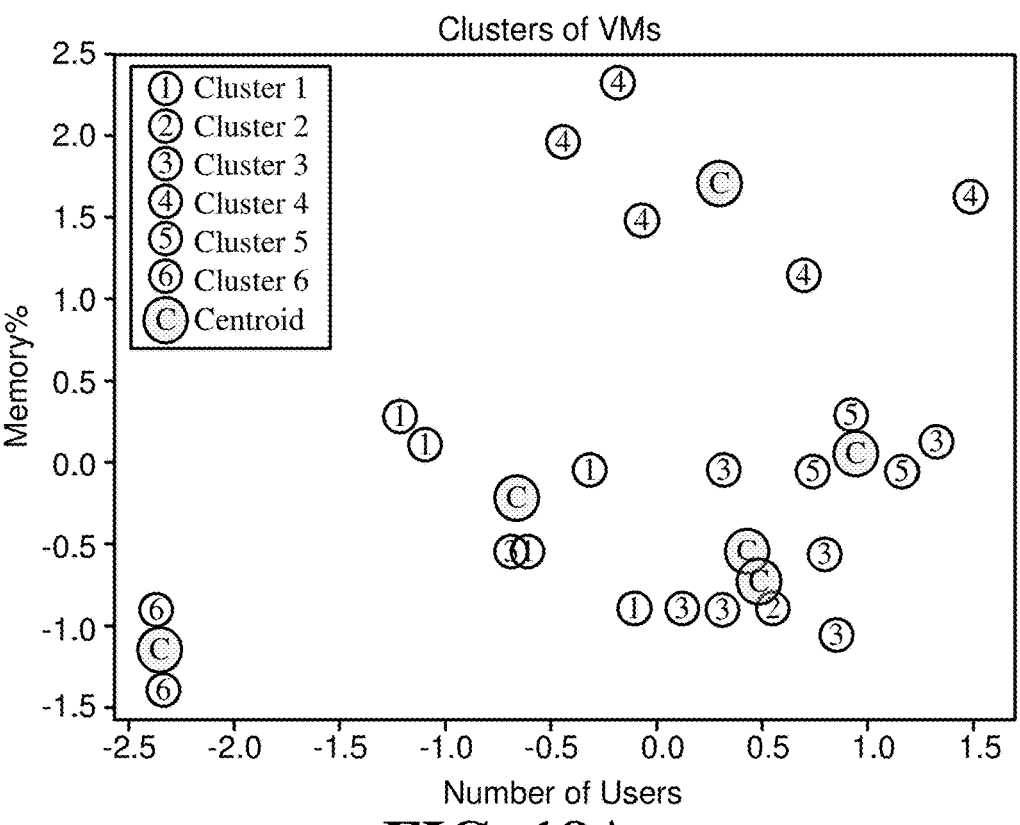
Figure 18B:
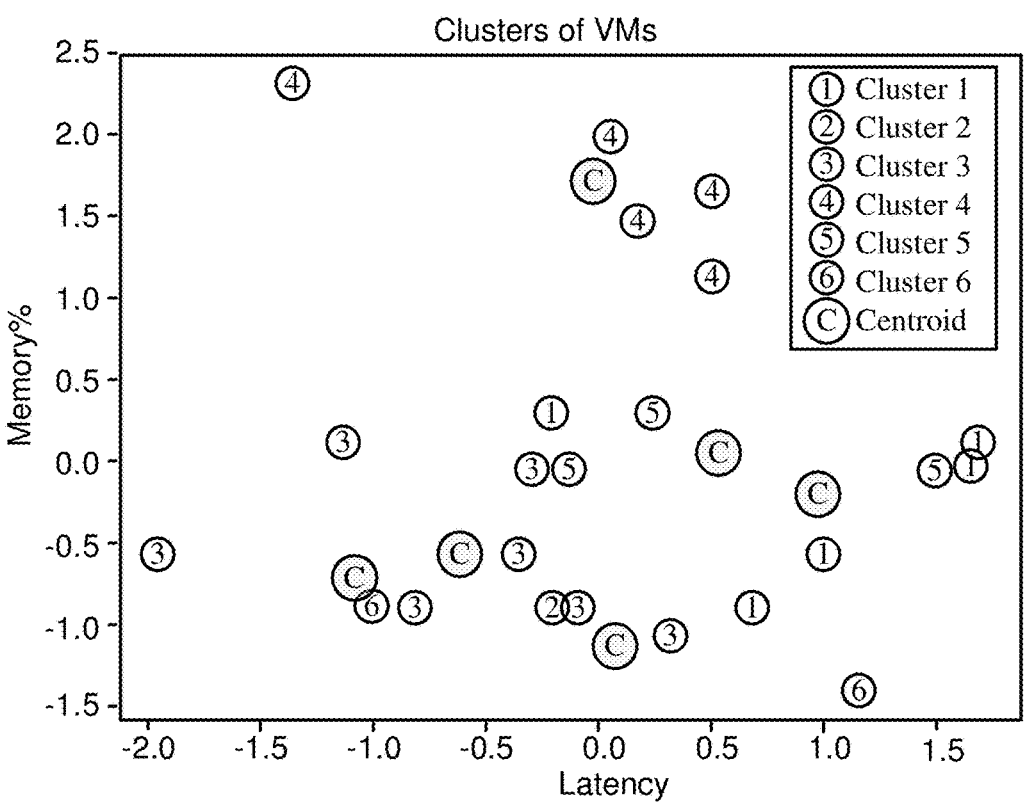

FIG. 18A compares memory percentage utilization versus number of users; this plot indicates that Cluster 5 performs the relative best among the clusters, with the highest number of users and mid-to-low memory consumption. FIG. 18B compares percentage memory utilization versus latency; nothing conclusive can be deduced from this plot.

Figure 19:
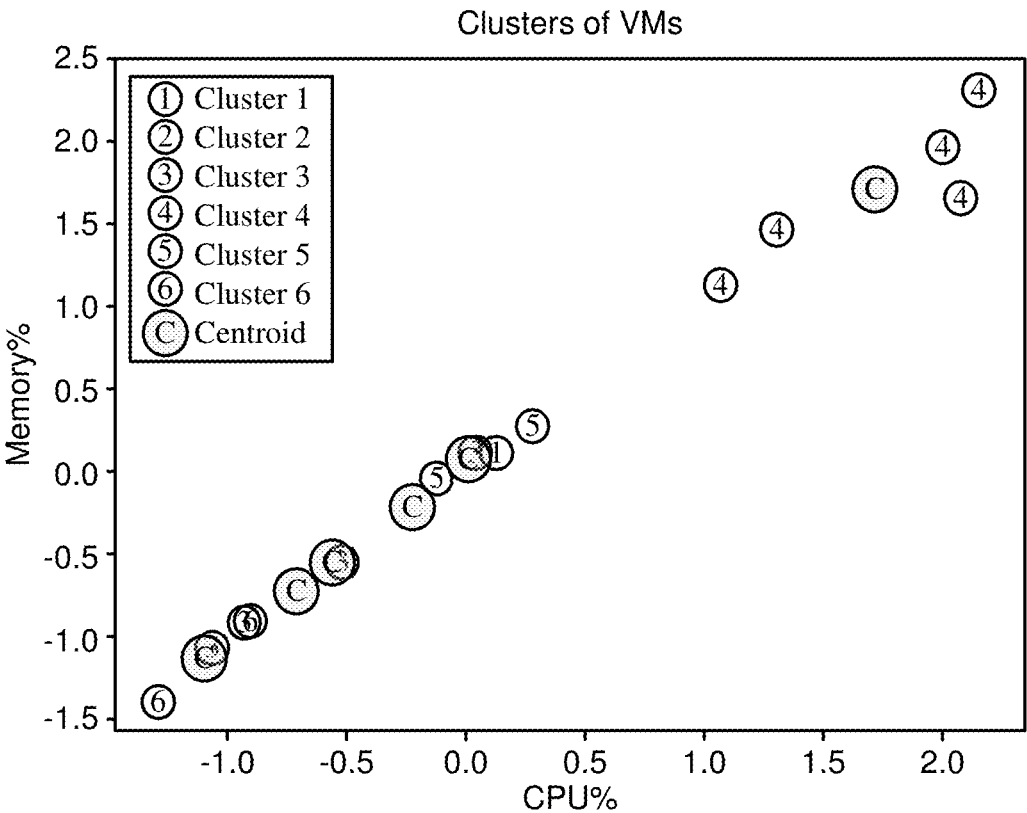

FIG. 19 shows memory percentage utilization versus CPU percentage utilization. The plot indicates a highly linear relationship for any of the clusters.

As can be seen, described herein is a technology that facilitates visualization of the incoming data at any given point of time, which can be used to predict if there is a need to enhance the infrastructure dynamically and plan for future deliverables. This data can be continuously collected as described herein, e.g., using a straightforward automated script or the like that can seamlessly fetch real-time data from the servers. Subsequently, this real-time data is transformed into a structured (e.g., .csv file) format and fed into a data analytics engine, which takes in the server performance data as input. The data analytics engine then applies the k-means clustering model to identify patterns and group similar server configurations together. Such clustering assists with gaining insights into the server infrastructure, facilitating informed decision-making.

The technology described herein thus can be implemented as an end-to-end solution, streamlining data collection, analysis, and presentation, e.g., for viewing the data center resource behavior on a production or test environment. With respect to dynamic allocation, the model takes this analyzed data and provides invaluable insights, by informing about the server infrastructure's performance and efficiency, which in turn facilitates informed decision-making and optimization.

One or more concepts described herein can be embodied in a system, such as represented in the example operations of FIG. 20, and for example can include at least one memory that stores computer executable components and/or operations, and at least one processor that executes computer executable components and/or operations stored in the memory. Example operations can include operation 2002, which represents inputting server infrastructure data comprising performance parameter values to a clustering model trained based on telecommunications data comprising telecommunications server time series data. Example operation 2004 represents, in response to the inputting of the server infrastructure data, obtaining clustered datasets representative of the server infrastructure data. Example operation 2006 represents taking an action based on the clustered datasets.

The clustering model can include a k-means clustering model.

Taking the action can include outputting a visible representation of at least two distinct values of the performance parameter values of the clustered datasets, the performance parameter values comprising at least two of: server utilization data representative of a utilization of a server, central processing unit (CPU) usage data representative of a utilization of a CPU, processing speed data representative of a processing speed, network utilization data representative of a utilization of a network, number of users data representative of a number of users connected via the network, memory usage data representative of a usage of memory, latency data representative of a latency associated with the network, bandwidth data representative of a bandwidth associated with the network, or throughput data representative of representative of a throughput associated with the network. The visible representation can include a two-dimensional graphical representation of a cluster data point at a graph location corresponding to a first parameter value of the at least two distinct performance parameter values of a cluster dataset in a first dimension, and a second parameter value of the at least two distinct performance parameters of the cluster dataset in a second dimension.

Taking the action can include outputting an alert based on the clustered datasets.

The server infrastructure data can include baseband unit data corresponding to a baseband unit pool.

Further operations can include obtaining the telecommunications data, dividing the telecommunications data into telecommunications server time series training data and telecommunications server time series testing data, and training the clustering model based on the training data in conjunction with validating the clustering model based on the testing data.

Further operations can include inputting the server infrastructure data to a time series prediction model to obtain time series server infrastructure data, and combining the time series server infrastructure data with the telecommunications data for subsequent retraining of the clustering model. The time series prediction model can include an autoregressive integrated moving average model.

Further operations can include inputting the server infrastructure data to a time series prediction model to obtain a forecast of a prediction for at least one performance parameter of the server infrastructure data. The time series prediction model can include an autoregressive integrated moving average model.

Further operations can include determining a number of distinct clusters based on the server infrastructure data and an elbow point among candidate numbers for the distinct clusters.

Further operations can include determining a number of distinct clusters data and an elbow point within an elbow curve representative of within-cluster sum of squares values, based on the server infrastructure data, for a specified range of different candidate numbers for the distinct clusters. Determining the number of distinct clusters can include applying a smoothing filter to the elbow curve.

One or more example embodiments, such as corresponding to example operations of a method, are represented in FIG. 21. Example operation 2102 represents obtaining, by a system comprising at least one processor, server infrastructure data comprising performance parameter values of server-related resources. Example operation 2104 represents determining, by the system, a number of respective cluster groups based on the server infrastructure data. Example operation 2106 inputting, by the system, the server infrastructure data to a k-means clustering model to obtain respective clustered datasets for the respective cluster groups. Example operation 2108 facilitating, by the system, taking an action based on at least one of the respective clustered datasets.

Facilitating the taking of the action can include plotting respective pairs of respective performance parameter values from the respective datasets, identified by respective visual representations of the respective cluster groups of the respective datasets, in a two-dimensional graph in which a respective pair of the respective pairs has an x-coordinate corresponding to a respective first performance parameter value of a respective dataset of the respective datasets, and a y-coordinate corresponding to a respective second performance parameter value of the respective dataset.

Further operations can include inputting, by the system, the server infrastructure data to an autoregressive integrated moving average model to obtain prediction data for at least one performance parameter of the server infrastructure data.

Further operations can include training, by the system, the k-means clustering model based on time series data collected from at least one telecommunications server.

FIG. 22 summarizes various example operations, e.g., corresponding to a machine-readable medium, comprising executable instructions that, when executed by at least one processor, facilitate performance of operations. Example operation 2202 represents inputting server infrastructure data comprising performance parameter values, for baseband unit resources of baseband units of a baseband unit pool, into a clustering model trained based on telecommunications server time series data. Example operation 2204 represents, in response to the inputting of the server infrastructure data, obtaining respective clustered datasets comprising respective performance parameter values. Example operation 2206 represents initiating an action based on the clustered datasets, the initiating of the action corresponding to at least one of: forecasting parameter values for the baseband units, monitoring operations of the baseband units, or maintaining the baseband units.

Further operations can include maintaining the server infrastructure data as time series data in conjunction with the telecommunications server time series data for subsequent training of an instance of the clustering model.

As can be seen, the technology described herein facilitates optimizing telecommunications server infrastructure resource allocation and capacity planning, through resource management assisted by clustering. For example, by identifying groups of users or areas with similar resource demands, telecommunications providers can efficiently allocate network resources and plan infrastructure upgrades. This can include customer segmentation, in which telecommunications companies can cluster their customers based on usage patterns, behavior, preferences, and demographics, to help in better understanding the different customer segments. Clustering (e.g., K-means clustering, an unsupervised machine learning model) can further help with service quality improvement by assessing service quality related to performance data in different regions or for different customer segments; telecommunications providers can identify areas with similar service issues and focus on improving the quality of service in those clusters.

The technology described herein provides intelligence built to identify clusters, for use in identifying similar data usage patterns and characteristics of a network and a customer base, based on streaming real-time telecom statistics that are clustered for monitoring and/or alerting. This facilitates dynamically maintaining a telecommunications server infrastructure, including in a C-RAN environment, which can be accomplished through visually and/or statistically exploring clustered datasets to determine patterns, trends, and/or relationships between server hardware components, users and/or other (e.g., network) resources. For example, at any given point of time, this technology can be used to visualize the incoming data and dynamically predict if there is a need modify the server infrastructure.

Figure 23:
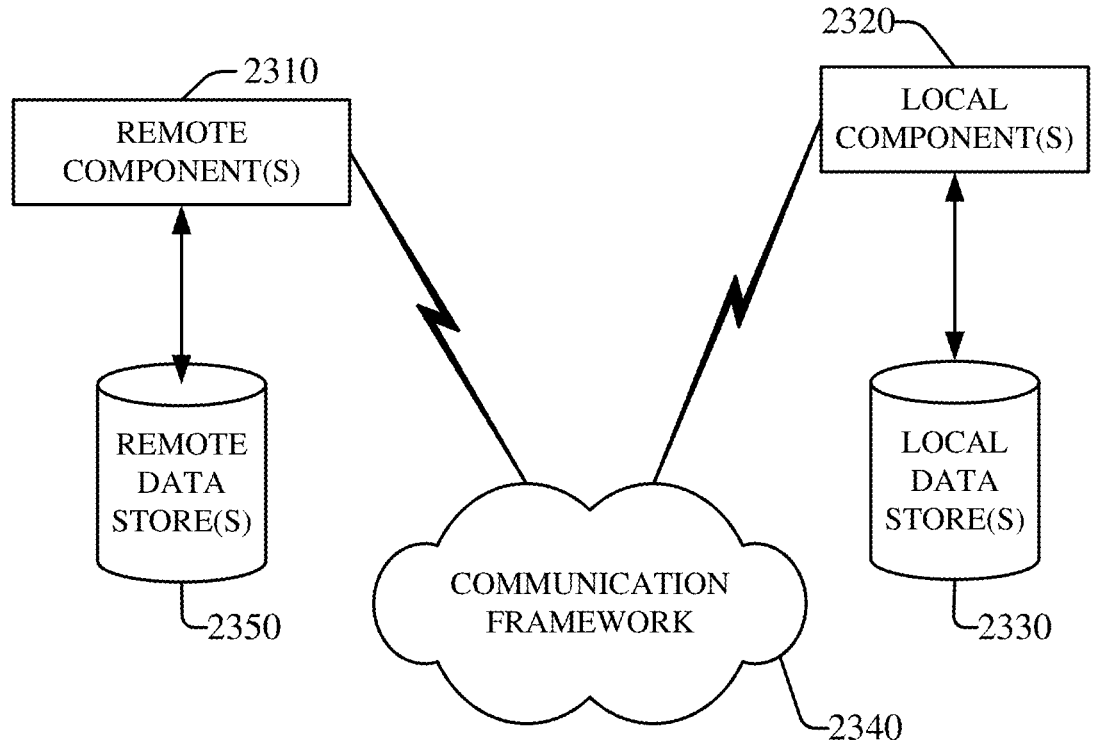
FIG. 23 is a block diagram representing an example computing environment into which embodiments of the subject matter described herein may be incorporated.

FIG. 23 is a schematic block diagram of a computing environment 2300 with which the disclosed subject matter can interact. The system 2300 comprises one or more remote component(s) 2310. The remote component(s) 2310 can be hardware and/or software (e.g., threads, processes, computing devices). In some embodiments, remote component(s) 2310 can be a distributed computer system, connected to a local automatic scaling component and/or programs that use the resources of a distributed computer system, via communication framework 2340. Communication framework 2340 can comprise wired network devices, wireless network devices, mobile devices, wearable devices, radio access network devices, gateway devices, femtocell devices, servers, etc.

The system 2300 also comprises one or more local component(s) 2320. The local component(s) 2320 can be hardware and/or software (e.g., threads, processes, computing devices). In some embodiments, local component(s) 2320 can comprise an automatic scaling component and/or programs that communicate/use the remote resources 2310, etc., connected to a remotely located distributed computing system via communication framework 2340.

One possible communication between a remote component(s) 2310 and a local component(s) 2320 can be in the form of a data packet adapted to be transmitted between two or more computer processes. Another possible communication between a remote component(s) 2310 and a local component(s) 2320 can be in the form of circuit-switched data adapted to be transmitted between two or more computer processes in radio time slots. The system 2300 comprises a communication framework 2340 that can be employed to facilitate communications between the remote component(s) 2310 and the local component(s) 2320, and can comprise an air interface, e.g., Uu interface of a UMTS network, via a long-term evolution (LTE) network, etc. Remote component(s) 2310 can be operably connected to one or more remote data store(s) 2350, such as a hard drive, solid state drive, SIM card, device memory, etc., that can be employed to store information on the remote component(s) 2310 side of communication framework 2340. Similarly, local component(s) 2320 can be operably connected to one or more local data store(s) 2330, that can be employed to store information on the local component(s) 2320 side of communication framework 2340.

Figure 24:
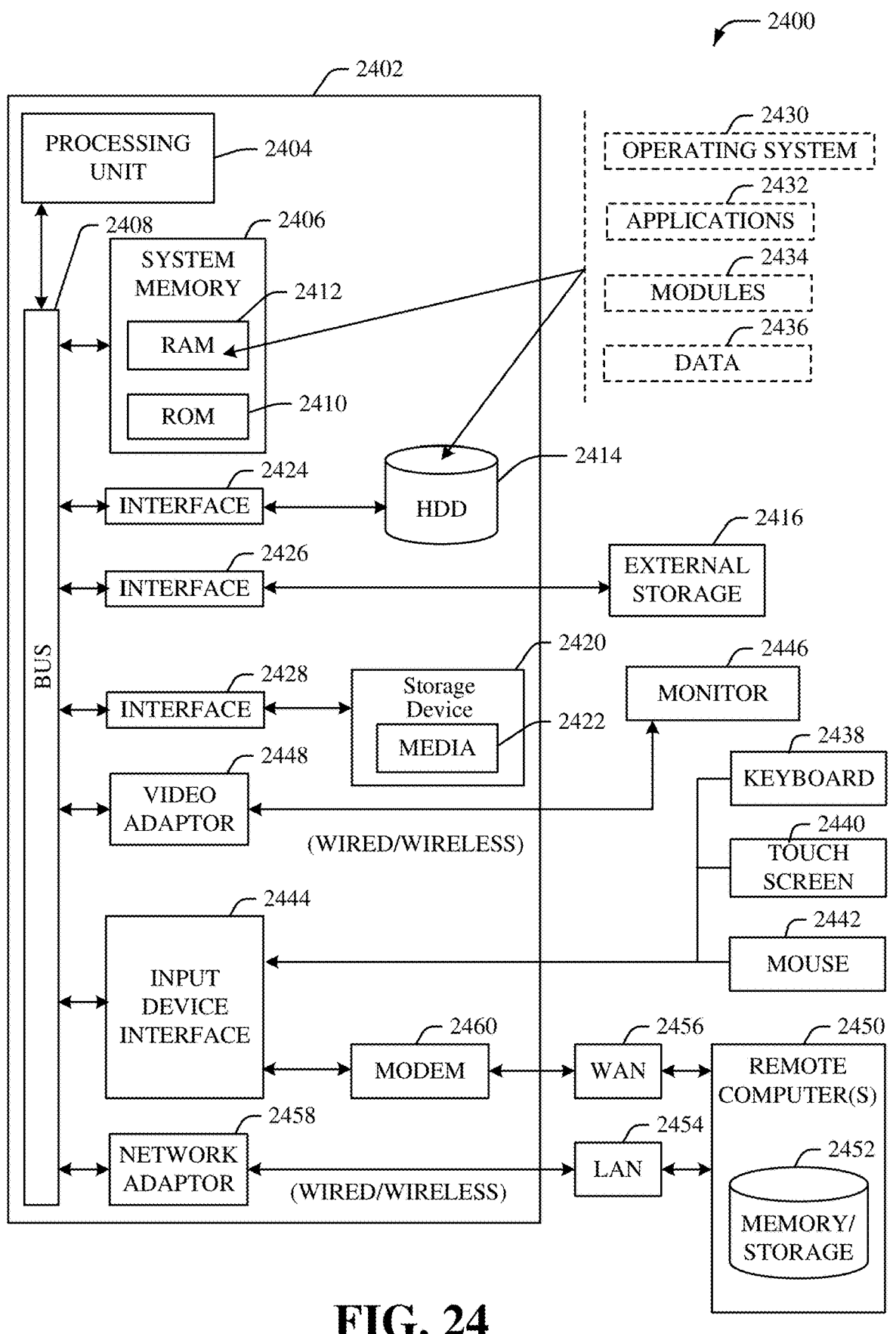
FIG. 24 depicts an example schematic block diagram of a computing environment with which the disclosed subject matter can interact/be implemented at least in part, in accordance with various embodiments and implementations of the subject disclosure.

In order to provide additional context for various embodiments described herein, FIG. 24 and the following discussion are intended to provide a brief, general description of a suitable computing environment 2400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 24, the example environment 2400 for implementing various embodiments of the aspects described herein includes a computer 2402, the computer 2402 including a processing unit 2404, a system memory 2406 and a system bus 2408. The system bus 2408 couples system components including, but not limited to, the system memory 2406 to the processing unit 2404. The processing unit 2404 can be any of various commercially available processors. Dual microprocessors and other multi-processor architectures can also be employed as the processing unit 2404.

The system bus 2408 can be any of several types of bus structure that can further interconnect to a memory bus (with or without a memory controller), a peripheral bus, and a local bus using any of a variety of commercially available bus architectures. The system memory 2406 includes ROM 2410 and RAM 2412. A basic input/output system (BIOS) can be stored in a non-volatile memory such as ROM, erasable programmable read only memory (EPROM), EEPROM, which BIOS contains the basic routines that help to transfer information between elements within the computer 2402, such as during startup. The RAM 2412 can also include a high-speed RAM such as static RAM for caching data.

The computer 2402 further includes an internal hard disk drive (HDD) 2414 (e.g., EIDE, SATA), and can include one or more external storage devices 2416 (e.g., a magnetic floppy disk drive (FDD) 2416, a memory stick or flash drive reader, a memory card reader, etc.). While the internal HDD 2414 is illustrated as located within the computer 2402, the internal HDD 2414 can also be configured for external use in a suitable chassis (not shown). Additionally, while not shown in environment 2400, a solid state drive (SSD) could be used in addition to, or in place of, an HDD 2414.

Other internal or external storage can include at least one other storage device 2420 with storage media 2422 (e.g., a solid state storage device, a nonvolatile memory device, and/or an optical disk drive that can read or write from removable media such as a CD-ROM disc, a DVD, a BD, etc.). The external storage 2416 can be facilitated by a network virtual machine. The HDD 2414, external storage device(s) 2416 and storage device (e.g., drive) 2420 can be connected to the system bus 2408 by an HDD interface 2424, an external storage interface 2426 and a drive interface 2428, respectively.

The drives and their associated computer-readable storage media provide nonvolatile storage of data, data structures, computer-executable instructions, and so forth. For the computer 2402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2412, including an operating system 2430, one or more application programs 2432, other program modules 2434 and program data 2436. All or portions of the operating system, applications, modules, and/or data can also be cached in the RAM 2412. The systems and methods described herein can be implemented utilizing various commercially available operating systems or combinations of operating systems.

Computer 2402 can optionally comprise emulation technologies. For example, a hypervisor (not shown) or other intermediary can emulate a hardware environment for operating system 2430, and the emulated hardware can optionally be different from the hardware illustrated in FIG. 24. In such an embodiment, operating system 2430 can comprise one virtual machine (virtual machine) of multiple virtual machines hosted at computer 2402. Furthermore, operating system 2430 can provide runtime environments, such as the Java runtime environment or the .NET framework, for applications 2432. Runtime environments are consistent execution environments that allow applications 2432 to run on any operating system that includes the runtime environment. Similarly, operating system 2430 can support containers, and applications 2432 can be in the form of containers, which are lightweight, standalone, executable packages of software that include, e.g., code, runtime, system tools, system libraries and settings for an application.

Further, computer 2402 can be enabled with a security module, such as a trusted processing module (TPM). For instance, with a TPM, boot components hash next in time boot components, and wait for a match of results to secured values, before loading a next boot component. This process can take place at any layer in the code execution stack of computer 2402, e.g., applied at the application execution level or at the operating system (OS) kernel level, thereby enabling security at any level of code execution.

A user can enter commands and information into the computer 2402 through one or more wired/wireless input devices, e.g., a keyboard 2438, a touch screen 2440, and a pointing device, such as a mouse 2442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2404 through an input device interface 2444 that can be coupled to the system bus 2408, but can be connected by other interfaces, such as a parallel port, an IEEE 2494 serial port, a game port, a USB port, an IR interface, a BLUETOOTH® interface, etc.

A monitor 2446 or other type of display device can be also connected to the system bus 2408 via an interface, such as a video adapter 2448. In addition to the monitor 2446, a computer typically includes other peripheral output devices (not shown), such as speakers, printers, etc.

The computer 2402 can operate in a networked environment using logical connections via wired and/or wireless communications to one or more remote computers, such as a remote computer(s) 2450. The remote computer(s) 2450 can be a workstation, a server computer, a router, a personal computer, portable computer, microprocessor-based entertainment appliance, a peer device or other common network node, and typically includes many or all of the elements described relative to the computer 2402, although, for purposes of brevity, only a memory/storage device 2452 is illustrated. The logical connections depicted include wired/wireless connectivity to a local area network (LAN) 2454 and/or larger networks, e.g., a wide area network (WAN) 2456. Such LAN and WAN networking environments are commonplace in offices and companies, and facilitate enterprise-wide computer networks, such as intranets, all of which can connect to a global communications network, e.g., the Internet.

When used in a LAN networking environment, the computer 2402 can be connected to the local network 2454 through a wired and/or wireless communication network interface or adapter 2458. The adapter 2458 can facilitate wired or wireless communication to the LAN 2454, which can also include a wireless access point (AP) disposed thereon for communicating with the adapter 2458 in a wireless mode.

When used in a WAN networking environment, the computer 2402 can include a modem 2460 or can be connected to a communications server on the WAN 2456 via other means for establishing communications over the WAN 2456, such as by way of the Internet. The modem 2460, which can be internal or external and a wired or wireless device, can be connected to the system bus 2408 via the input device interface 2444. In a networked environment, program modules depicted relative to the computer 2402 or portions thereof, can be stored in the remote memory/storage device 2452. It will be appreciated that the network connections shown are examples and other means of establishing a communications link between the computers can be used.

When used in either a LAN or WAN networking environment, the computer 2402 can access cloud storage systems or other network-based storage systems in addition to, or in place of, external storage devices 2416 as described above. Generally, a connection between the computer 2402 and a cloud storage system can be established over a LAN 2454 or WAN 2456 e.g., by the adapter 2458 or modem 2460, respectively. Upon connecting the computer 2402 to an associated cloud storage system, the external storage interface 2426 can, with the aid of the adapter 2458 and/or modem 2460, manage storage provided by the cloud storage system as it would other types of external storage. For instance, the external storage interface 2426 can be configured to provide access to cloud storage sources as if those sources were physically connected to the computer 2402.

The computer 2402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related resource or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
at least one processor; and
at least one memory that stores executable instructions that, when executed by the at least one processor, perform operations comprising:
inputting server infrastructure data comprising performance parameter values to a clustering model trained based on telecommunications data comprising telecommunications server time series data;
in response to the inputting of the server infrastructure data, obtaining clustered datasets representative of the server infrastructure data, wherein obtaining the clustered datasets comprises determining, using the clustering model, a number of distinct clusters data and an elbow point within an elbow curve representative of within-cluster sum of squares values, based on the server infrastructure data, for a specified range of different candidate numbers for distinct clusters by applying a smoothing filter to the elbow curve; and
taking an action based on the clustered datasets.

2. The system of claim 1, wherein the clustering model comprises a k-means clustering model.

3. The system of claim 1, wherein the taking of the action comprises outputting a visible representation of at least two distinct values of the performance parameter values of the clustered datasets, the performance parameter values comprising at least two of: server utilization data representative of a utilization of a server, central processing unit (CPU) usage data representative of a utilization of a CPU, processing speed data representative of a processing speed, network utilization data representative of a utilization of a network, number of users data representative of a number of users connected via the network, memory usage data representative of a usage of memory, latency data representative of a latency associated with the network, bandwidth data representative of a bandwidth associated with the network, or throughput data representative of representative of a throughput associated with the network.

4. The system of claim 3, wherein the visible representation comprises a two-dimensional graphical representation of a cluster data point at a graph location corresponding to a first parameter value of the at least two distinct performance parameter values of a cluster dataset in a first dimension, and a second parameter value of the at least two distinct performance parameter values of the cluster dataset in a second dimension.

5. The system of claim 1, wherein the taking of the action comprises outputting an alert based on the clustered datasets.

6. The system of claim 1, wherein the server infrastructure data comprises baseband unit data corresponding to a baseband unit pool.

7. The system of claim 1, wherein the operations further comprise obtaining the telecommunications data, dividing the telecommunications data into telecommunications server time series training data and telecommunications server time series testing data, and training the clustering model based on the training data in conjunction with validating the clustering model based on the testing data.

8. The system of claim 1, wherein the operations further comprise inputting the server infrastructure data to a time series prediction model to obtain time series server infrastructure data, and combining the time series server infrastructure data with the telecommunications data for subsequent retraining of the clustering model.

9. The system of claim 8, wherein the time series prediction model comprises an autoregressive integrated moving average model.

10. The system of claim 1, wherein the operations further comprise inputting the server infrastructure data to a time series prediction model to obtain a forecast of a prediction for at least one performance parameter of the server infrastructure data.

11. The system of claim 10, wherein the time series prediction model comprises an autoregressive integrated moving average model.

12. A non-transitory machine-readable medium, comprising executable instructions that, when executed by at least one processor perform operations comprising:
inputting server infrastructure data comprising performance parameter values, for baseband unit resources of baseband units of a baseband unit pool, into a clustering model trained based on telecommunications server time series data;
in response to the inputting of the server infrastructure data, obtaining respective clustered datasets comprising respective performance parameter values, wherein obtaining the respective clustered datasets comprises determining, using the clustering model, a number of distinct clusters data and an elbow point within an elbow curve representative of within-cluster sum of squares values, based on the server infrastructure data, for a specified range of different candidate numbers for distinct clusters by applying a smoothing filter to the elbow curve; and
initiating an action based on the clustered datasets, the initiating of the action corresponding to at least one of: forecasting parameter values for the baseband units, monitoring operations of the baseband units, or maintaining the baseband units.

13. The non-transitory machine-readable medium of claim 12, wherein the operations further comprise maintaining the server infrastructure data as time series data in conjunction with the telecommunications server time series data for subsequent training of an instance of the clustering model.

14. The non-transitory machine-readable medium of claim 12, wherein the clustering model comprises a k-means clustering model.

15. A method, comprising:
inputting, by a system comprising at least one processor, server infrastructure data comprising performance parameter values to a clustering model trained based on telecommunications data comprising telecommunications server time series data;

in response to the inputting of the server infrastructure data, obtaining, by the system, clustered datasets representative of the server infrastructure data, wherein obtaining the clustered datasets comprises determining, using the clustering model, a number of distinct clusters data and an elbow point within an elbow curve representative of within-cluster sum of squares values, based on the server infrastructure data, for a specified range of different candidate numbers for distinct clusters by applying a smoothing filter to the elbow curve; and taking, by the system, an action based on the clustered datasets.

16. The method of claim 15, wherein the clustering model comprises a k-means clustering model.

17. The method of claim 15, wherein the taking of the action comprises outputting a visible representation of at least two distinct values of the performance parameter values of the clustered datasets, the performance parameter values comprising at least two of: server utilization data representative of a utilization of a server, central processing unit (CPU) usage data representative of a utilization of a CPU, processing speed data representative of a processing speed, network utilization data representative of a utilization of a network, number of users data representative of a number of users connected via the network, memory usage data representative of a usage of memory, latency data representative of a latency associated with the network, bandwidth data representative of a bandwidth associated with the network, or throughput data representative of representative of a throughput associated with the network.

18. The method of claim 17, wherein the visible representation comprises a two-dimensional graphical representation of a cluster data point at a graph location corresponding to a first parameter value of the at least two distinct performance parameter values of a cluster dataset in a first dimension, and a second parameter value of the at least two distinct performance parameter values of the cluster dataset in a second dimension.

19. The method of claim 15, wherein the taking of the action comprises outputting an alert based on the clustered datasets.

20. The method of claim 15, wherein the server infrastructure data comprises baseband unit data corresponding to a baseband unit pool.

* * * * *